(12) United States Patent
Martin

(10) Patent No.: US 8,505,772 B2
(45) Date of Patent: Aug. 13, 2013

(54) FERRULE PACKAGE AND METHOD OF PACKAGING AND LOADING FERRULES

(75) Inventor: Gerald Martin, St. Charles, MO (US)

(73) Assignee: New Rule Products, Inc., St. Charles, MO (US)

(*) Notice: Subject to any disclaimer, the term of this patent is extended or adjusted under 35 U.S.C. 154(b) by 840 days.

(21) Appl. No.: 12/272,463

(22) Filed: Nov. 17, 2008

(65) Prior Publication Data

US 2009/0126321 A1 May 21, 2009

Related U.S. Application Data

(63) Continuation-in-part of application No. 10/900,253, filed on Jul. 27, 2004, now Pat. No. 7,451,893.

(51) Int. Cl.
*B65G 59/00* (2006.01)
*B65G 47/14* (2006.01)
*G07F 11/16* (2006.01)

(52) U.S. Cl.
USPC ............... 221/298; 221/22; 221/1; 221/197; 221/312 A; 221/289; 206/155; 206/179; 219/136; 219/98; 219/99; 224/159; 53/473

(58) Field of Classification Search
USPC ............. 206/155, 179; 53/473; 224/159; 221/22, 1, 197, 312 A, 289, 298; 219/136, 219/98, 99
See application file for complete search history.

(56) References Cited

U.S. PATENT DOCUMENTS

| | | | |
|---|---|---|---|
| 4,346,804 A * | 8/1982 | Powderly | 206/338 |
| 4,497,405 A * | 2/1985 | Mikic et al. | 206/378 |
| 4,600,118 A | 7/1986 | Martin | |
| 4,752,146 A * | 6/1988 | Buckle | 401/35 |
| 5,163,580 A * | 11/1992 | Beach et al. | 221/1 |
| 5,704,515 A | 1/1998 | Martin | |
| 5,865,341 A * | 2/1999 | Martin | 221/197 |
| 5,927,497 A * | 7/1999 | Baumgartner et al. | 206/493 |
| 5,944,220 A * | 8/1999 | Garske et al. | 221/312 A |
| 6,112,944 A * | 9/2000 | Van Hoorn et al. | 221/298 |
| 6,471,074 B2 * | 10/2002 | Coleman et al. | 211/49.1 |
| 6,502,719 B2 * | 1/2003 | Huang | 221/227 |
| 6,808,084 B2 * | 10/2004 | Horn et al. | 221/289 |
| 6,908,022 B2 * | 6/2005 | Schmitz | 227/119 |
| 7,090,455 B2 * | 8/2006 | Lamb | 411/531 |
| 7,093,714 B2 * | 8/2006 | Huang | 206/493 |
| 7,344,051 B2 * | 3/2008 | Flamingo et al. | 221/312 A |
| 7,451,893 B2 * | 11/2008 | Martin | 221/298 |
| 7,464,833 B2 * | 12/2008 | Goers | 221/312 A |
| 7,507,379 B2 * | 3/2009 | Hunnell | 422/537 |
| 7,717,921 B2 * | 5/2010 | Rezach | 606/99 |
| 7,722,623 B2 * | 5/2010 | Franks et al. | 606/104 |

\* cited by examiner

*Primary Examiner* — Gene O. Crawford
*Assistant Examiner* — Rakesh Kumar
(74) *Attorney, Agent, or Firm* — Armstrong Teasdale LLP

(57) ABSTRACT

A container for packing and shipping stud welding ferrule aligned along a spindle. The container comprises a body having a top, a bottom, opposing side walls and opposing end walls defining a storage space therein. The container further comprises a spindle retainer operatively connected to the body. The spindle retainer has a transverse portion and a longitudinal portion connected to the transverse portion. The transverse portion extends from one of the end walls and toward and into the storage space, while the longitudinal portion extends from the transverse portion and toward the bottom of the body. The transverse portion and the longitudinal portion are sized and shaped to accept and to retain ends of the spindle to contain the spindle within the body.

4 Claims, 26 Drawing Sheets

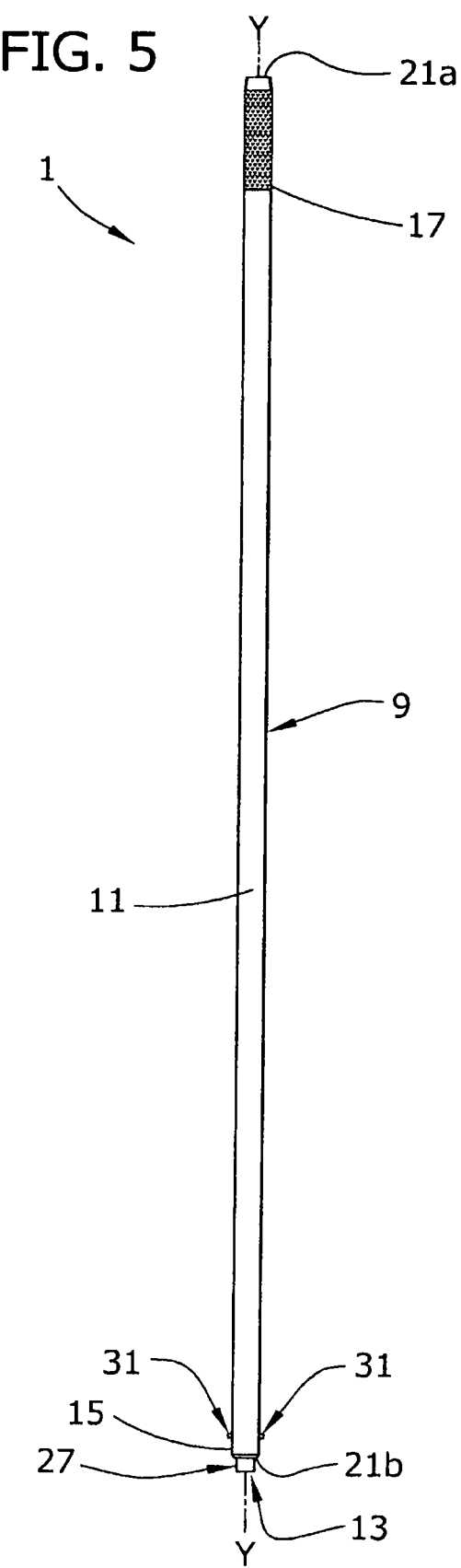

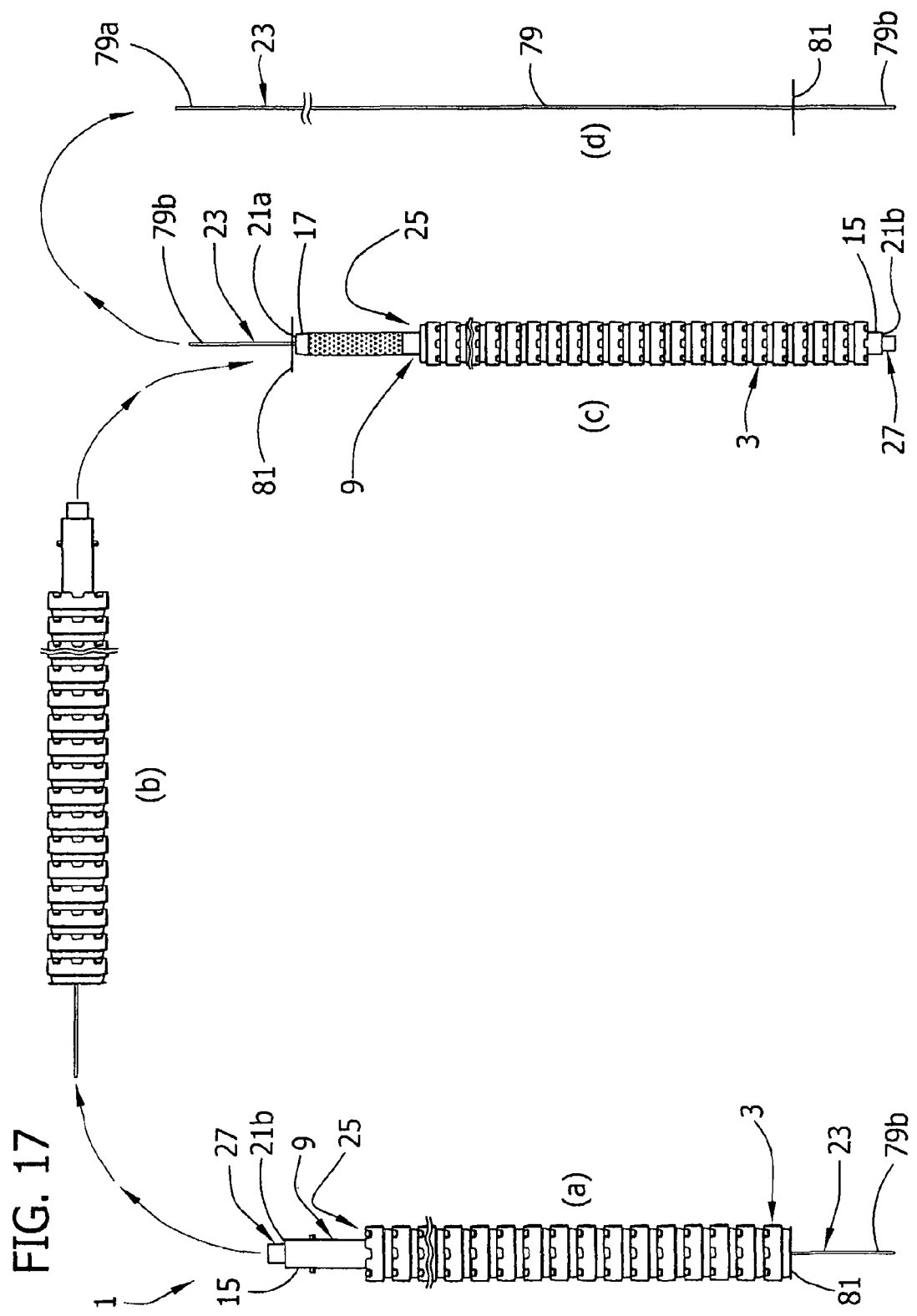

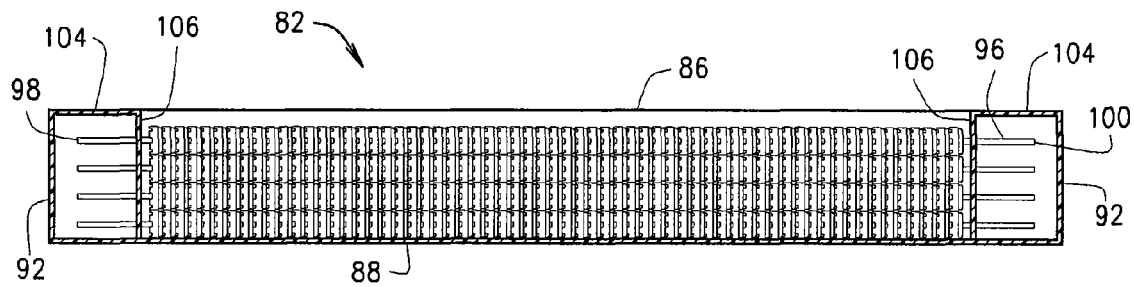
F I G . 2 1
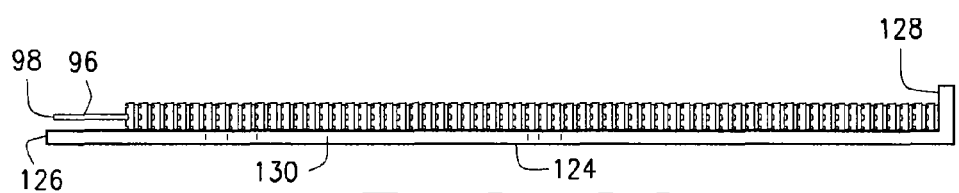
F I G . 2 2
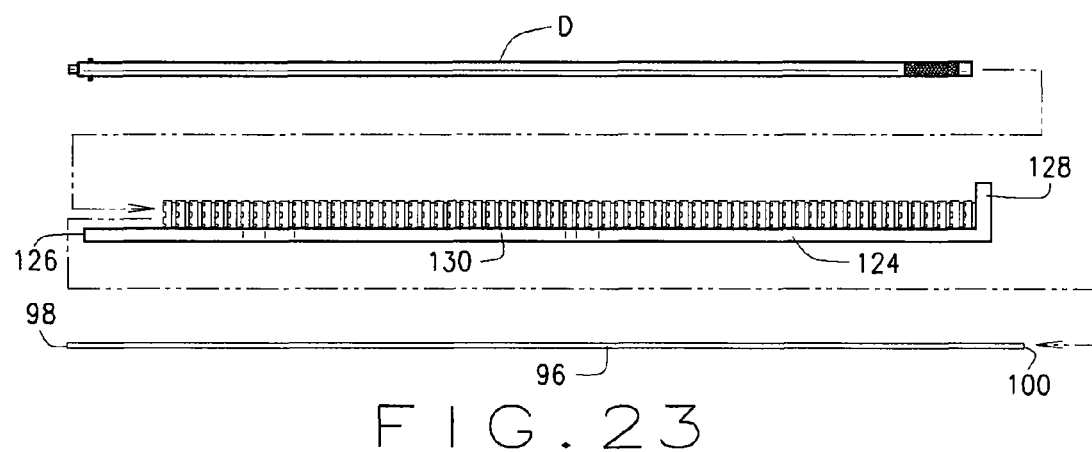
F I G . 2 3
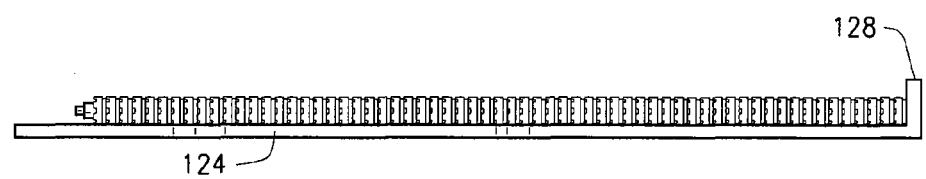
F I G . 2 4

FERRULE PACKAGE AND METHOD OF PACKAGING AND LOADING FERRULES

CROSS-REFERENCE TO RELATED APPLICATIONS

This application is a continuation-in-part of and claims priority under 35 U.S.C. §120 to U.S. Non-Provisional patent application Ser. No. 10/900,253 filed Jul. 27, 2004, in the name of the present inventor and entitled "Ferrule Dispenser and Ferrule Package" and is incorporated herein by reference.

STATEMENT REGARDING FEDERALLY SPONSORED RESEARCH

Not Applicable.

BACKGROUND OF THE DISCLOSURE

The present invention relates generally to ferrules used in welding studs to a work surface. In particular, it relates to a dispenser for placing the individual ferrules on the work surface, and to packaging and loading ferrules for use with the dispenser.

During structural construction, metal studs are commonly used to improve shear strength in concrete slabs and to provide mounting structure for components of a structural framework. The studs can be connected directly to a bare beam of a structure or can be connected through metal decking to an underlying beam of a structure. An arc welding process, such as drawn arc welding, is often used to make these connections. When using the drawn arc process, ceramic ferrules are positioned around a base of the stud. The ferrules concentrate weld heat between the stud and the work surface and contain the molten pool of melted metal around the base of the stud. This improves quality of the weld and facilitates formation of a strong weld filet.

Ferrules are usually ordered based on the number of studs to weld. The packaging of ferrules usually is conducted remote from the work site with the package ferrules delivered to the job site. But the ferrules are usually packaged based on weight. This can lead to inaccurate orders because a moisture content and a density of each ferrule may vary. Two boxes of ferrules with similar weights may contain a significantly different numbers of ferrules. The worker is not certain of the precise number of ferrules in each package, making planning for a job difficult.

The ferrules are also randomly packaged in boxes prior to shipping. This can damage a substantial number of the ferrules and can possibly leave only a fraction of the received ferrules usable. Accordingly, accurately ordering a desired number of ferrules for a stud welding project can be difficult.

In response to these drawbacks, ferrule manufactures may use a ferrule retainer to ship the ferrules. Examples are shown in U.S. Pat. Nos. 4,600,118 and 5,704,515, the disclosures of which are hereby incorporated by reference. These retainers are capable of holding a set number of ferrules in a uniform arrangement and can reduce potential damage to the ferrules that may occur during shipping. The retainers usually include a restraining feature at the ends for holding the ferrules in place. But having two restraining features can be somewhat burdensome. They require an additional step in making and loading the retainers because at least one of the restraining features must be subsequently added after the ferrules are loaded. They also require an additional step to access the ferrules at the work site because at least one of the restraining features must be removed. The retainer on the bottom of the rod is removed by breaking the rod at a predetermined notch into which the retainer fits, thus allowing the retainer to fall off the rod. The rod is then withdrawn from the ferrules, thereby releasing the ferrules into the applicator and where they are retained by the applicator apparatus. Accordingly, there is a need for a simple and efficient way to ship ferrules to a work site.

In another current method of packing ferrules into a container or package, the packer loads individual ferrules along a non-rigid structure such as a wire tie. After positioning the center boars of the ferrules along the non-rigid wire, the packer loops the ends of the wire to maintain the ferrule. The packer then places the wired ferrules into the package. Since there wire is non-rigid the ferrules tend to inner mingle during shipping leading to broken ferrules and tangled ferrules upon removal from the package at the work site. Further, when the end user receives the wired ferrules, the user grasps both ends of the wire to lift the ferrules out of the package. Since the wire is non-rigid, the wire requires another worker to assist in removing the ferrules from the wire and to load the ferrules onto a dispenser. Requiring more than worker to assist in loading and unloading ferrules, however, leads to inefficient use of labor time.

At the work site, it is known to have workers place the ferrules at predetermined locations along the work surface by hand, repeatedly bending over to do so. At the same time, the worker properly orients the ferrule. As the ferrules are placed, the worker may drag the box of ferrules alongside in order to maintain a constant supply. This, however, is extremely time consuming and physically demanding. So as an alternative, the worker may pre-load ferrules into a bolt bag. But this is also inefficient as the worker must constantly re-fill the bag. In addition, the pre-loaded ferrules are subject to damage and still require repeated bending to place.

In response to these inefficiencies, a ferrule applicator may be used to place the ferrules on the work surface and thereby reduce the physical stress of repeated bending. Examples of applicators are shown in U.S. Pat. Nos. 4,600,118, 5,704,515, and 6,112,944. Ferrule applicators of the prior art are generally capable of holding multiple ferrules in a uniform arrangement for repetitious placing on the work surface. In a common prior art applicator, ball bearings are located around one end of the applicator for selectively holding the ferrules or releasing them onto the work surface. In some of these applicators, the ferrules are retained inside the applicator. A spring loaded tubular plunger slides over an outer surface of the applicator and biases the ball bearings to either engage the ferrules and retain them inside the applicator or release the ferrules and allow them to fall to the work surface. In other applicators, the ferrules are retained on an outer surface of the applicator. A spring loaded plunger slides longitudinally inside the applicator and again biases ball bearings to selectively retain or release the ferrules.

But these prior art applicators have drawbacks. For example, the ball bearings may stick or wedge in either a hold position or a release position, resulting in inconsistent operation. In addition, the ball bearings may inadvertently engage a side surface of a ferrule as it is released. This can possibly jam the ferrule on (or in) the applicator and can potentially damage the ferrule so that it is unusable. Moreover, the ball bearings may only move partially into and out of the applicator. As a result, an irregular ferrule with a slightly larger than average diameter may not be effectively retained, and an irregular ferrule with a slightly smaller than average diameter may not fully pass over the bearings.

Accordingly, there is a need for a ferrule retainer that loads quickly and easily, and that reliably retains ferrules during shipping or storing. In addition, there is a need for a ferrule retainer that allows easy access to the retained ferrules at a work site. There is a further need for a ferrule applicator that can reliably place ferrules onto a work surface without jamming and without damaging the ferrules and that can consistently operate time after time.

SUMMARY OF THE INVENTION

In one aspect of the invention, a container for packing and shipping stud welding ferrule aligned along a spindle. The container comprises a body having a top, a bottom, opposing side walls and opposing end walls defining a storage space therein. The container further comprises a spindle retainer operatively connected to the body. The spindle retainer has a transverse portion and a longitudinal portion connected to the transverse portion. The transverse portion extends from one of the end walls and toward and into the storage space, while the longitudinal portion extends from the transverse portion and toward the bottom of the body. The transverse portion and the longitudinal portion are sized and shaped to accept and to retain ends of the spindle to contain the spindle within the body.

In another aspect of the invention, a package of stud welding ferrules generally comprises multiple sets of ferrules, each including individual ferrules arranged generally one ferrule after another in a stack. Each ferrule is generally annular in shape with an open center and a height. In addition, the package of stud welding ferrules comprises a spindle for each set of ferrules, received through the ferrules' open centers. The spindle has a length, first and second ends, and a retainer. The retainer is located at the spindle's first end and retains the ferrules from moving past the retainer and off the first end. The spindle's second end is free of a retainer. The package of ferrules further comprises a container receiving the multiple sets of ferrules so that the second end of each spindle is separated from the container by a distance that is less than the height of one of the ferrules. In this position, the container holds the ferrules from moving off of the spindle's second end.

In still another aspect of the invention, a method for packaging stud welding ferrules generally includes providing a set of stud welding ferrules where each ferrule in the set has a height and a center opening. The set of ferrules is arranged in a stack on a spindle, which is received through the center openings of each ferrule in the set. Structure is provided, generally at a first end of the spindle, for retaining the ferrules on the spindle. A second end of the spindle is free of a similar structure that would prevent the ferrules from moving off of the spindle's second end. The spindle is then placed in a container so that the second end of the spindle is spaced from the container a distance that is less than the height of one of the ferrules.

In yet a further aspect of the invention, a method for loading a ferrule dispenser with stud welding ferrules that are to be dispensed from the ferrule dispenser onto a work surface generally comprises orienting a spindle, which is received through center openings of annular ferrules thereby arranging the ferrules generally in a stack, so that a first end of the spindle, which has a retainer thereon preventing ferrules from moving off of the spindle, is located lower than a second end of the spindle. The second end of the spindle is free of any retainer that would prevent ferrules from moving off the second end. A second end of a rod of the ferrule dispenser is then slid onto the spindle so that the spindle moves into the rod's second end. As this happens, the ferrules move from the spindle onto an outer surface of the rod, toward the rod's first end, transferring the ferrules from the spindle to the rod.

Other features will be in part apparent and in part pointed out hereinafter.

BRIEF DESCRIPTION OF THE DRAWINGS

FIG. 5 is an elevation of the ferrule dispenser of FIG. 1 with the ferrules removed;

FIG. 17 is a schematic illustrating movement of the inverted ferrule dispenser of FIG. 16C to a position ready for dispensing the ferrules onto the work surface.

FIG. 21 is a side elevational view of FIG. 20 illustrating sets of ferrules and spindles retained on top of one another and within the package;

FIG. 22 is a side elevational view of a removed set of ferrules and spindles placed in a trough;

FIG. 23 is a side elevational of the wire removed from the set of ferrules placed in the trough and a ferrule dispenser inserted within the set of ferrules.

FIG. 24 is a side elevational view of the ferrule dispenser partially positioned within the set of ferrules.

Corresponding reference characters indicate corresponding parts throughout the views of the drawings.

DETAILED DESCRIPTION OF THE INVENTION

Figure 1:
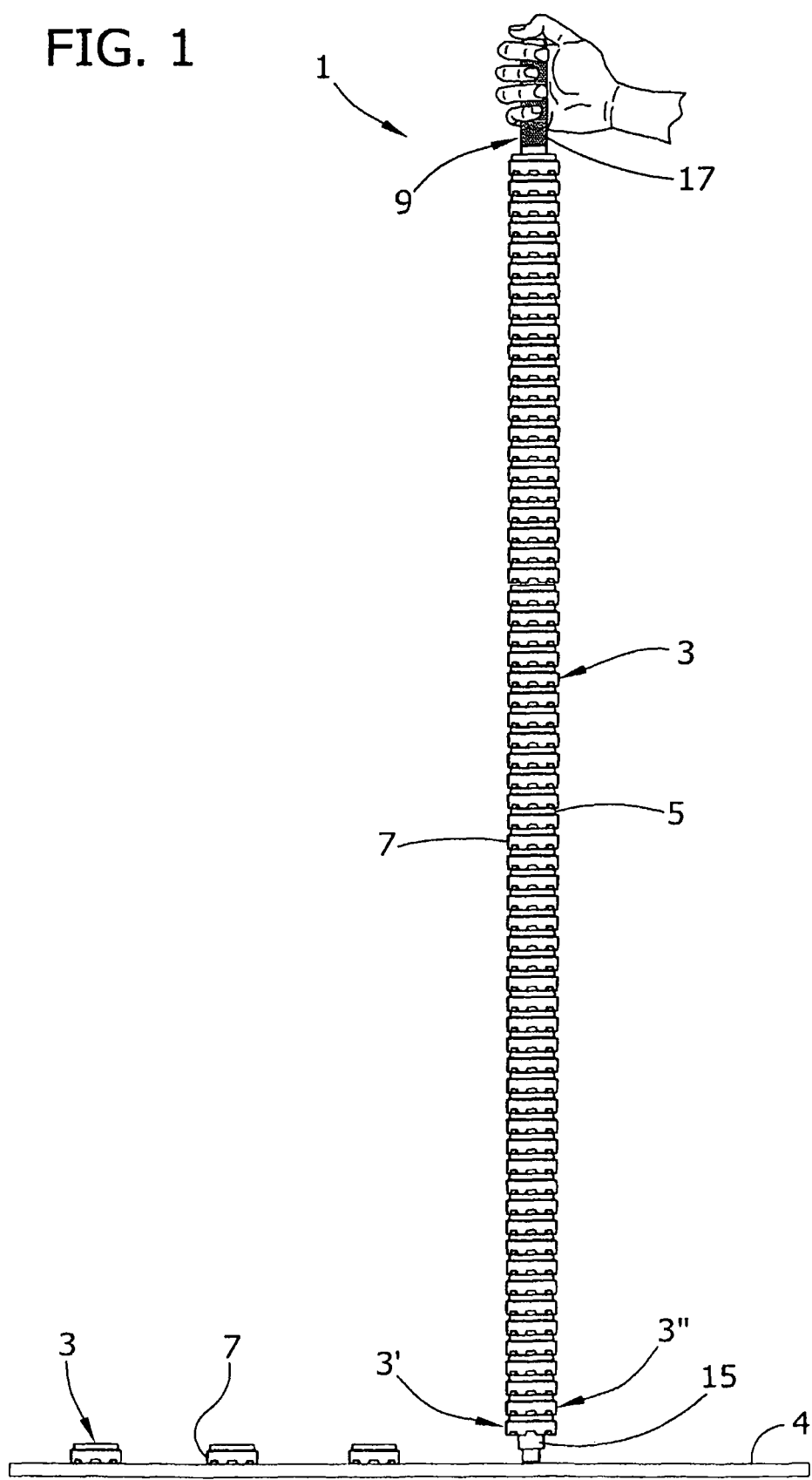
FIG. 1 is an elevation of a ferrule dispenser loaded with ferrules and being used to place the ferrules onto a work surface.

Referring now to the drawings, and particularly to FIG. 1, a ferrule dispenser is shown designated generally by reference numeral 1. The illustrated dispenser 1 is loaded with a number N of stud welding ferrules, each generally designated by reference numeral 3, (in the illustrated embodiment, the ferrule dispenser 1 is loaded with sixty-three ferrules) of which a lowermost ferrule on the dispenser is designated generally by reference numeral 3' and a second subsequent ferrule generally by reference numeral 3". A ferrule dispenser may hold more or less than sixty-three ferrules without departing from the scope of the invention. The illustrated dispenser 1 is capable of being used by a worker (not shown) to dispense the ferrules 3 onto a work surface 4 at desired stud locations, one ferrule at a time and one after another. Each dispensed ferrule 3 is properly orientated on the work surface 4 for receiving a stud (not shown). The work surface 4 may be a bare beam of a bridge frame or may be a metal deck used to form a floor of a building. The metal deck may further be corrugated for strength. It is to be understood that while the illustrated dispenser 1 is described and illustrated as being used with standard ferrules 3, the ferrule dispenser may hold different types of ferrules without departing from the scope of the invention. Examples of modified ferrules capable of being used with the dispenser 1 will be described hereinafter.

Figure 2A:
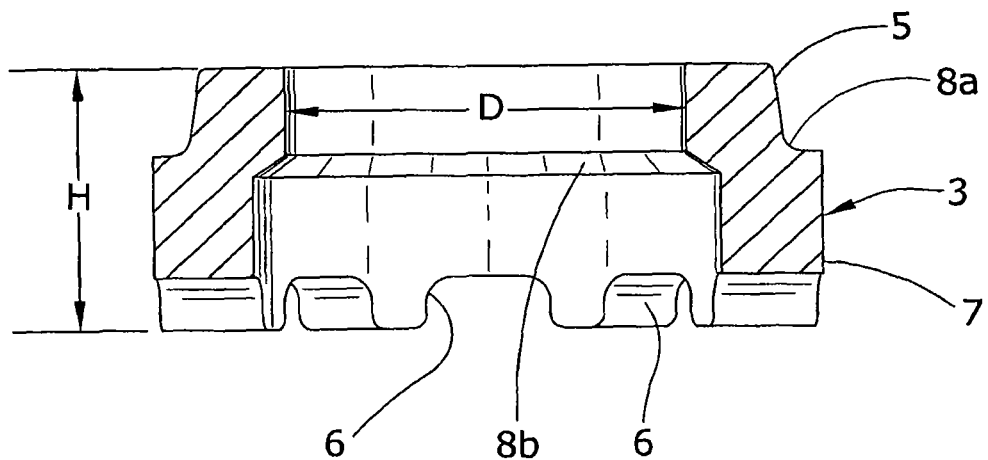
FIG. 2A is an enlarged vertical section of a standard ¾" WTD type ferrule.
Figure 2B:
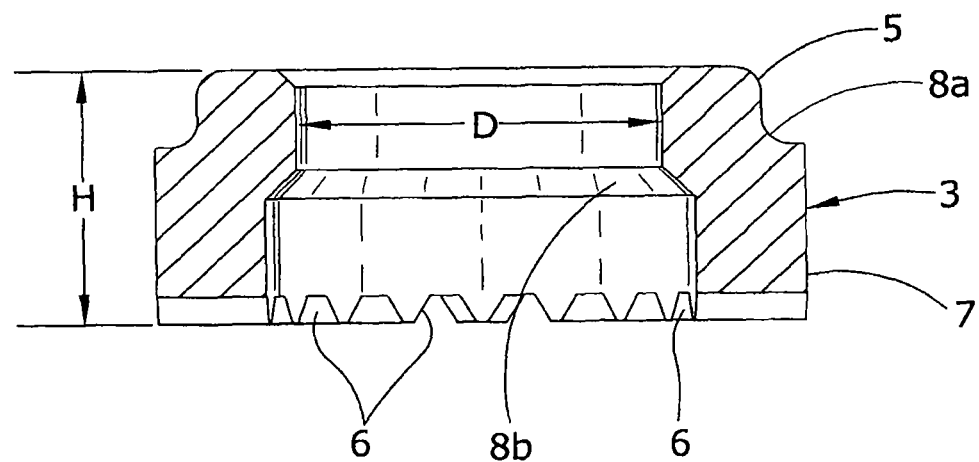
FIG. 2B is an enlarged vertical section of a standard ¾" F type ferrule.
Figure 3A:
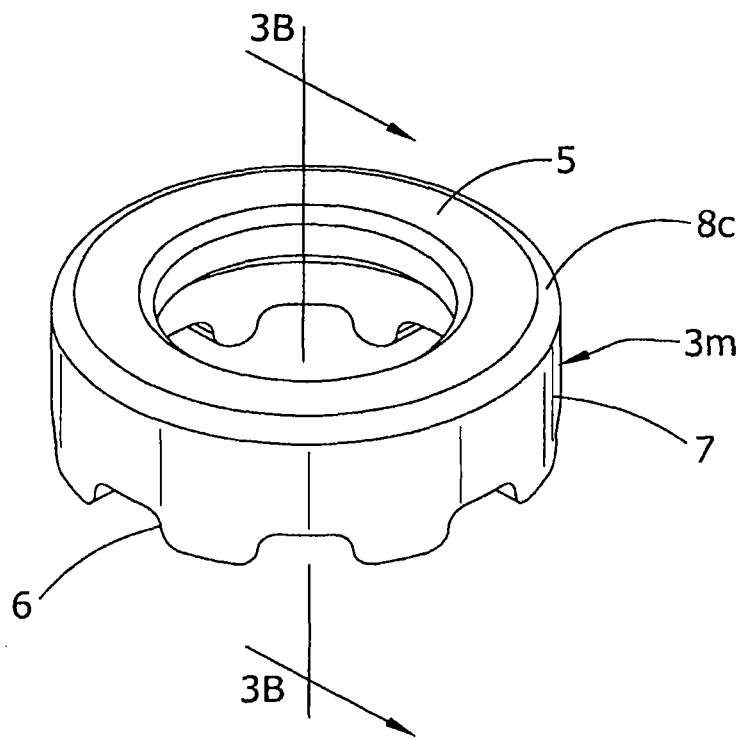
FIG. 3A is an enlarged perspective of a modified ¾" WTD type ferrule.
Figure 3B:
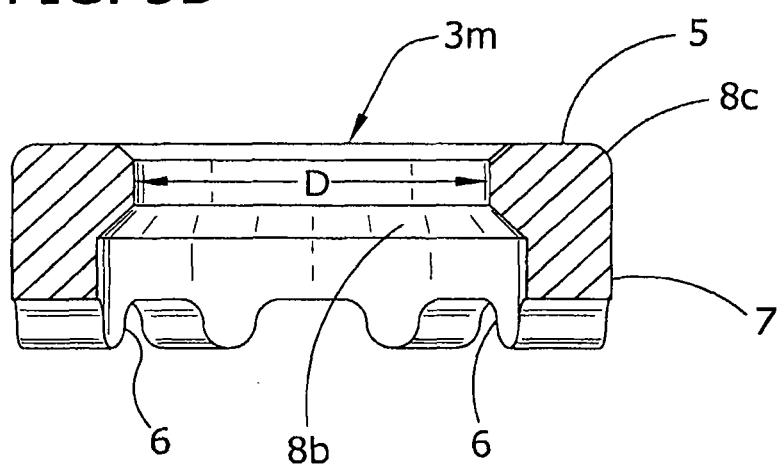
FIG. 3B is a vertical section of the modified ferrule taken on line 3B-3B of FIG. 3A.

FIGS. 2A and 2B show two types of standard ferrules 3 capable of being used with the illustrated ferrule dispenser 1. Other types of standard ferrules 3 may be used with the dispenser 1 without departing from the scope of the invention. Both types of illustrated ferrules 3 are generally annular in shape and have an open center. They include a top collar 5 and a skirt 7 that together support the stud (not shown) in a perpendicular orientation on the work surface 4. The skirt 7 is generally wider than the top collar 5 so that a concave shoulder 8a is formed around an exterior of the ferrule 3. The ferrule 3 also includes an inner shoulder 8b around the interior of the ferrule. The skirt 7 also includes multiple weld vents 6 along its base. The vents 6 control air flow to the stud during the welding process, and thereby improve the quality of the weld and maximize the strength of a resulting weld filet.

A standard ¾" WTD type ferrule is shown in FIG. 2A. This ferrule 3 is generally used when welding through a metal floor deck to connect the stud to an underlying beam. It has an overall height H ranging from about 0.575 inches to about 0.63 inches and an inner diameter D ranging from about 0.78 inches to about 0.84 inches. A standard ¾" F type ferrule is shown in FIG. 2B. This ferrule 3 is generally used when welding directly to a bare beam to connect the stud. It has an overall height H ranging from about 0.575 inches to about 0.68 inches and an inner diameter D ranging from about 0.76 inches to about 0.80 inches. It is understood that a dispenser loaded with ferrules having dimensions outside the ranges just described does not depart from the scope of the invention.

Figure 4A:
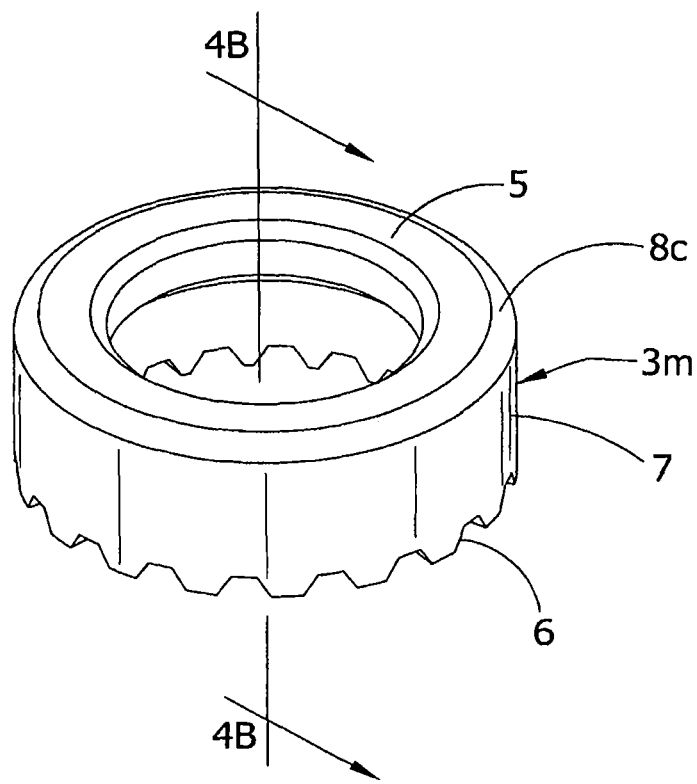
FIG. 4A is an enlarged perspective of a modified ¾" F type ferrule.
Figure 4B:
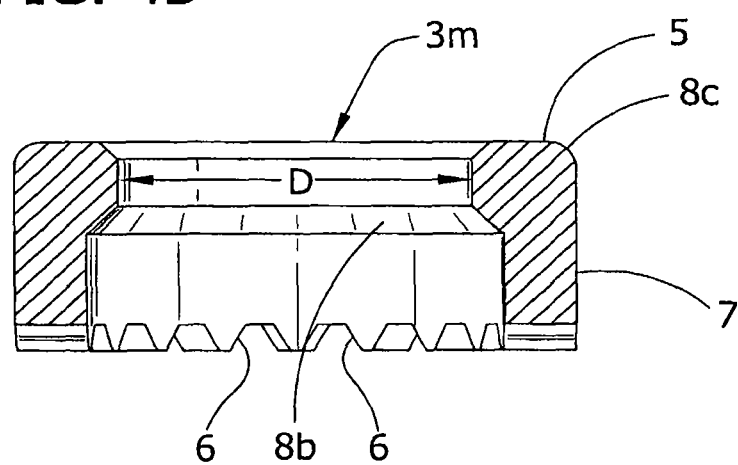
FIG. 4B is a vertical section of the modified ferrule taken on line 4B-4B of FIG. 4A.

FIGS. 3A-4B show two types of modified ferrules capable of being used with the illustrated ferrule dispenser 1. The modified ferrules are designated generally by reference numeral 3m, and in the figures are generally represented by a modified ¾" WTD type ferrule (FIGS. 3A and 3B) and a modified ¾" F type ferrule (FIGS. 4A and 4B). Other types of modified ferrules 3m may be used with the dispenser 1 without departing from the scope of the invention. The illustrated modified ferrules 3m are substantially similar to the standard ferrules 3 previously described, but include a squared-off shoulder 8c around the exterior of the ferrule and have a different overall height H. In one version of the modified ferrules 3m, each ferrule has an overall height H of about 0.5 inches or less. In another version, they each have an overall height H greater than or equal to about 0.8. inches. It is to be understood that a dispenser loaded with modified ferrules having dimensions outside the ranges just described or loaded with ferrules having differently shape collars and skirts, including differently shaped shoulders, do not depart from the scope of the invention.

It is envisioned that during the welding process a modified ferrule grip (not shown) will be used to accommodate the squared-off shoulders of the modified ferrules 3m and to securely hold the ferrule around a base of the stud as a weld is formed. It is further envisioned that the modified grip is substantially similar to grips known in the art, but is shaped to receive the squared-off shoulders 8c of the modified ferrules. In particular, it is envisioned that the modified grip is constructed by rabbeting a gripping surface (i.e., the surface of the grip contacting and holding the ferrule as the weld is formed) of any standard grip so that the modified grip fits over the squared-off shoulders 8c of the ferrule and locates the ferrule 3m in proper position to form a weld filet. This modified grip could also be used with standard ferrules 3.

Referring now to FIGS. 1 and 5, the ferrule dispenser 1 generally comprises an elongate support (in the illustrated dispenser, the elongate support is a tubular rod 9) and a spring loaded cam system, which is generally designated by reference numeral 13. The cam system 13 is mounted on the rod 9 and selectively holds the ferrules 3 on the rod 9 or releases them onto the work surface 4. The rod 9 is sized and shaped for passing through the open center of each ferrule 3 and for receiving multiple ferrules onto an outer surface 11 of the rod 9. The rod 9 includes a longitudinal axis, identified as Y-Y in FIG. 5, a dispensing end 15 supporting the cam system 13, and a handle 17. The dispensing end 15 is chamfered around an outer circumference of the rod 9. But a dispenser with a dispensing end squared off (i.e., not chamfered) does not depart from the scope of the invention. The handle 17 of the illustrated dispenser is slightly tapered for aiding in loading the ferrules 3 onto the rod 9. It additionally includes light knurling around the rod's outer surface 11 for helping a worker grasp the dispenser 1. It is understood, however, that a mechanism in which the handle is squared off (i.e., not tapered) does not depart from the scope of the invention. Additionally, a mechanism having a handle that does not include knurling or that includes a different grip does not depart from the scope of the invention. A mechanism having an elongate support different from a rod does not depart from the scope of the invention.

Figure 6:
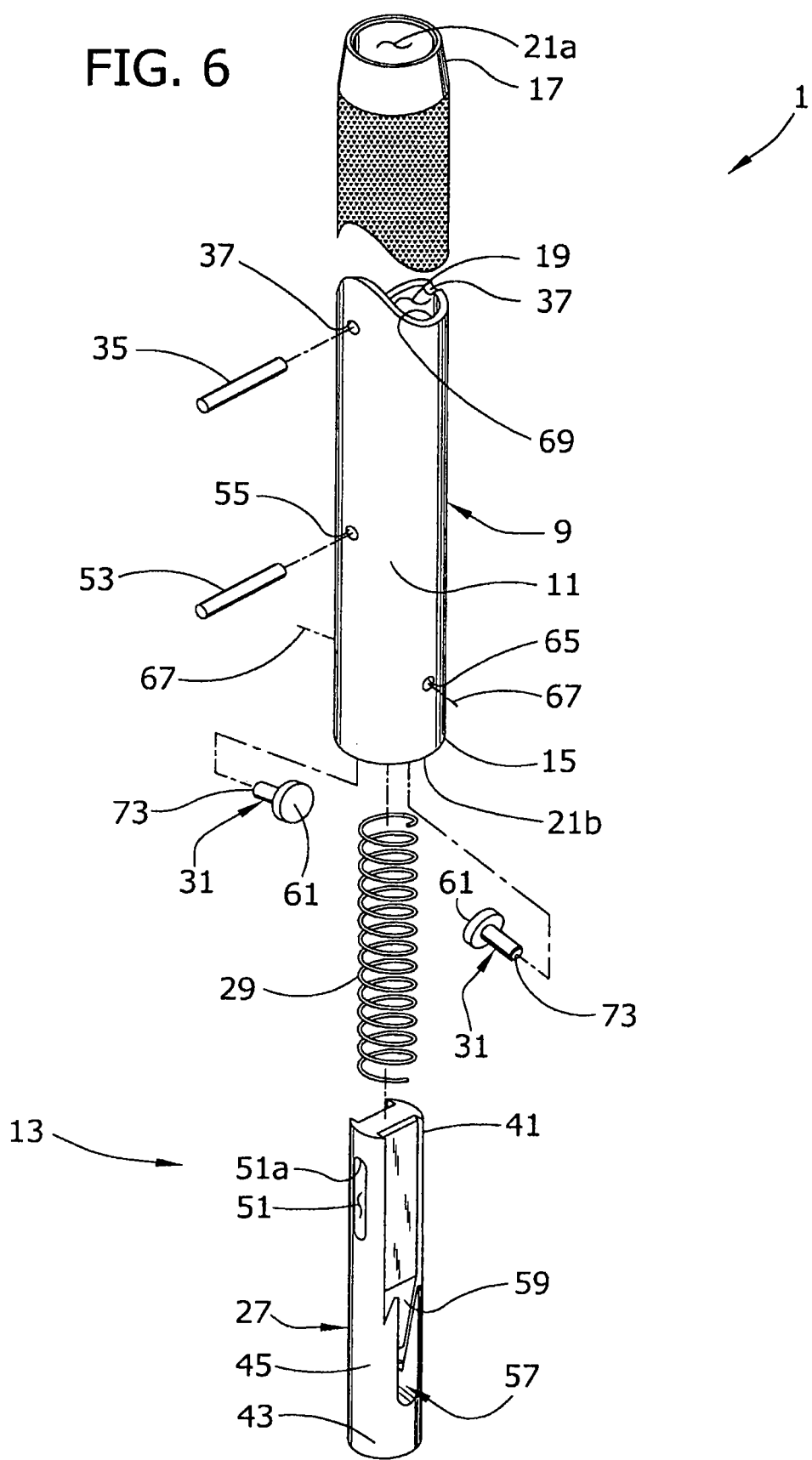
FIG. 6 is an enlarged, fragmentary exploded perspective of the ferrule dispenser.
Figure 7A:
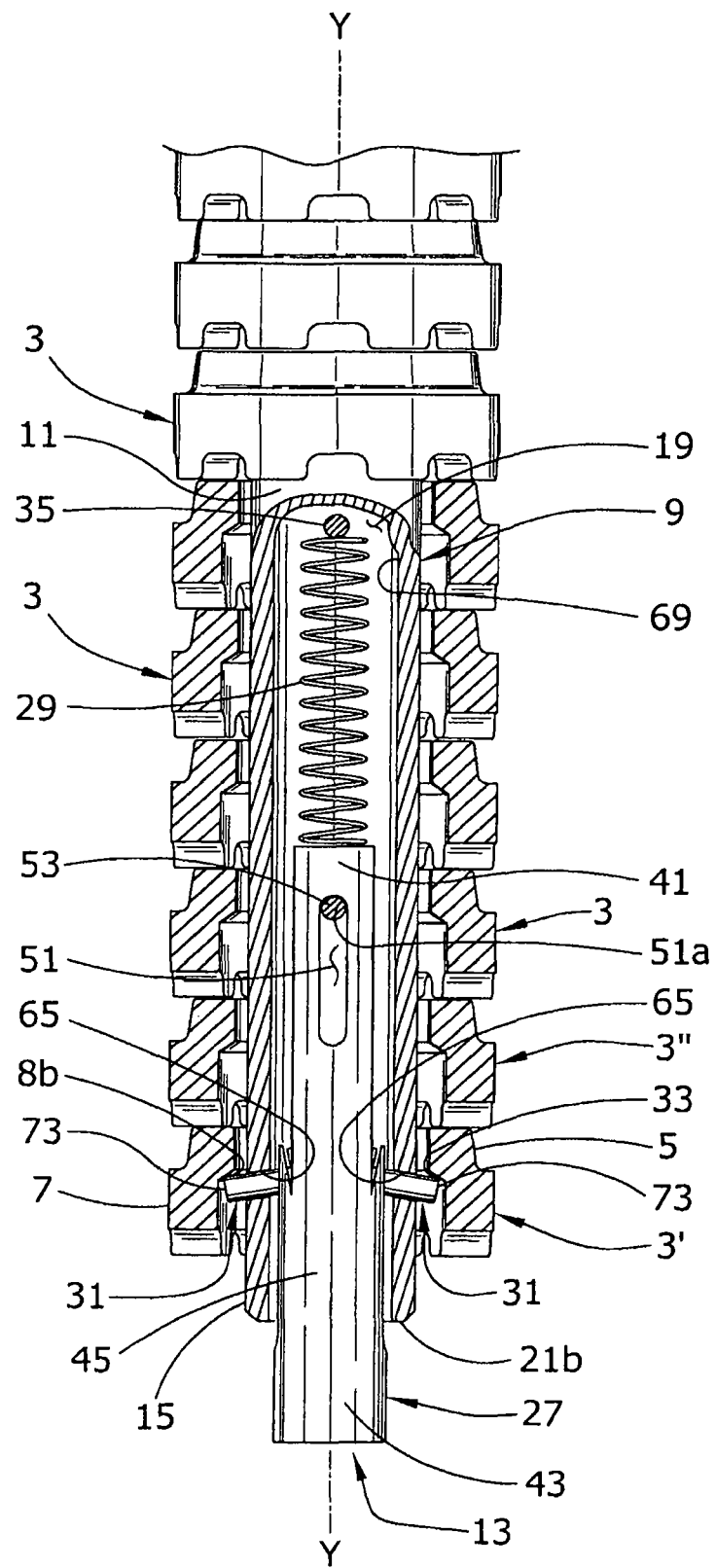
FIG. 7A is a fragmentary elevation of the ferrule dispenser with portions of a rod of the dispenser and some of the ferrules broken away to show internal construction.
Figure 7B:
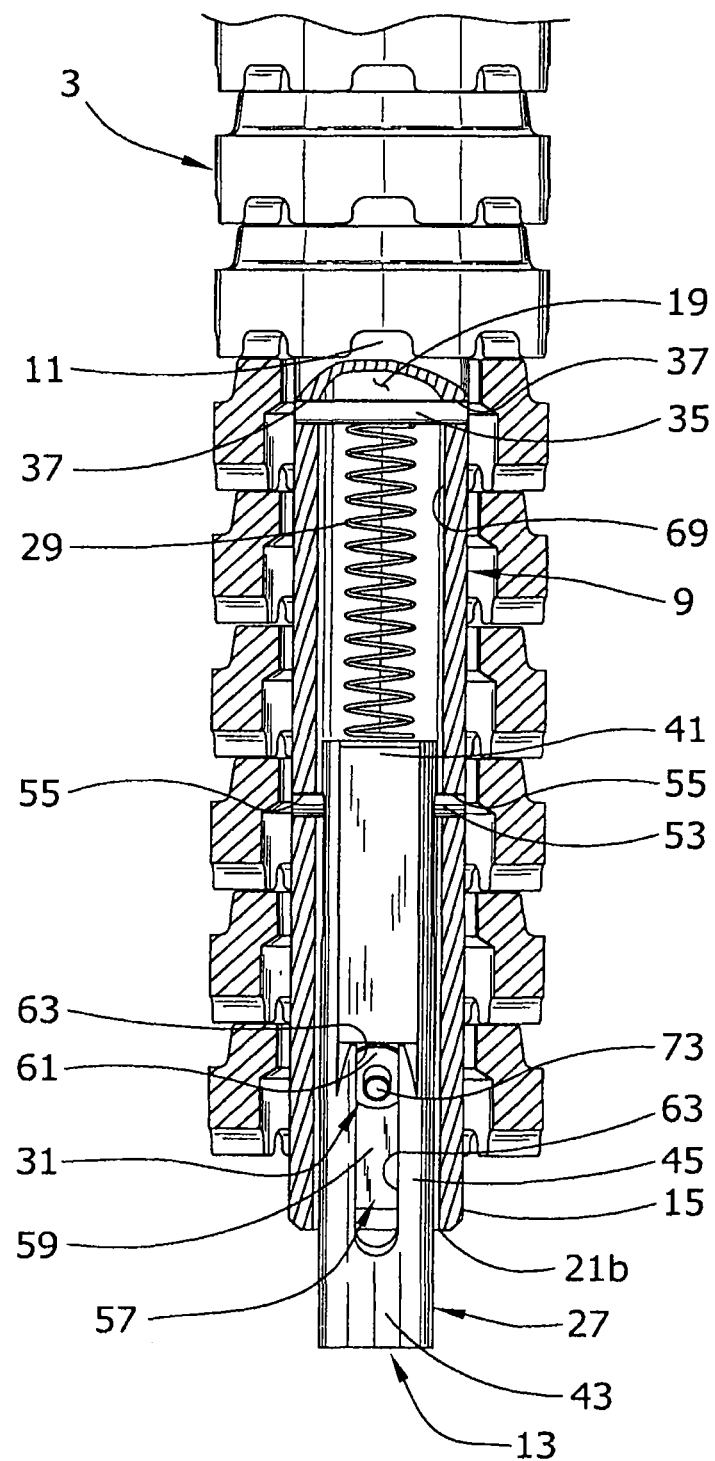
FIG. 7B is a fragmentary elevation similar to FIG. 7A, but with the ferrule dispenser rotated 90.degree. about longitudinal axis Y-Y of FIG. 7A.
Figure 8A:
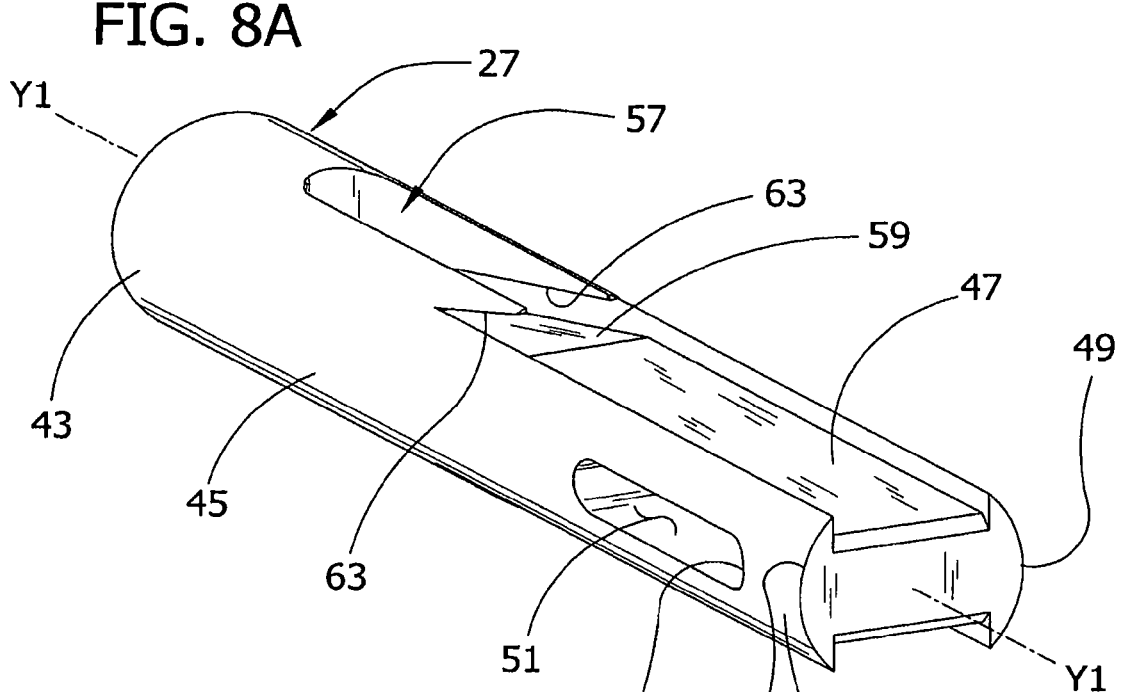
FIG. 8A is a perspective of a cam of the ferrule dispenser.
Figure 8B:
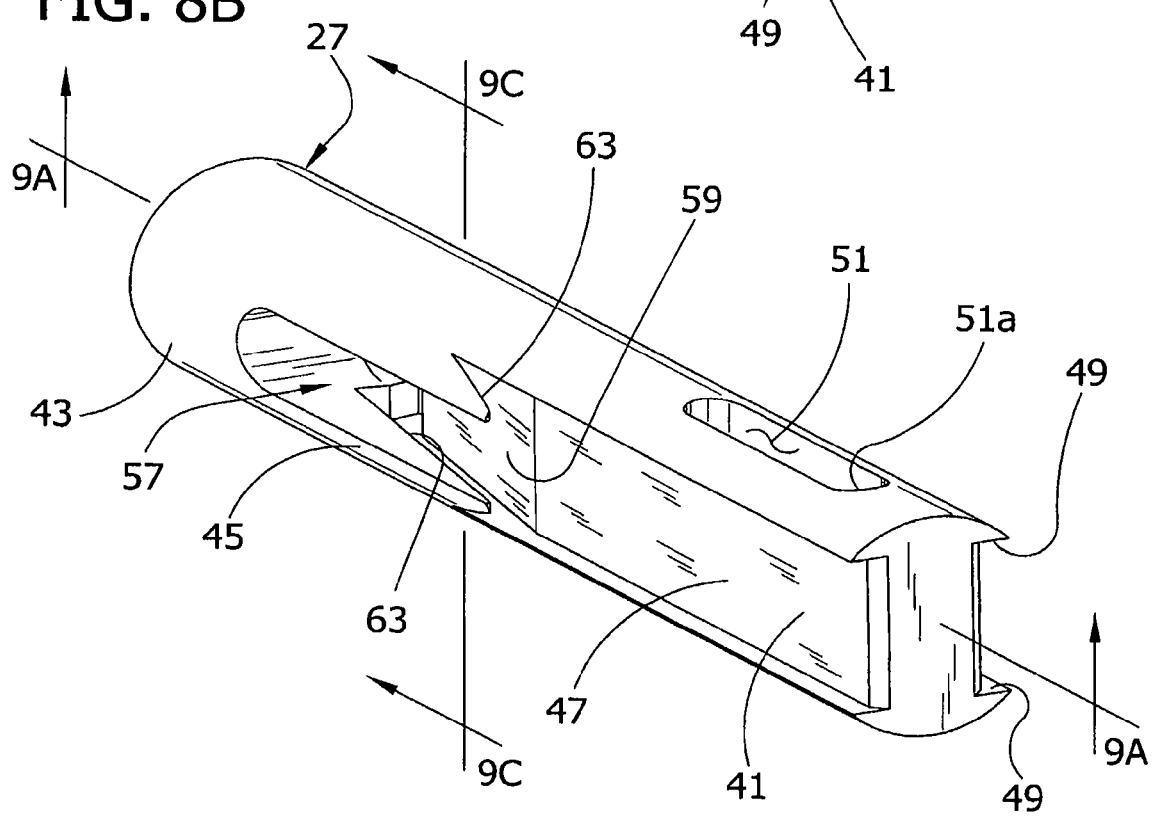
FIG. 8B is the perspective of FIG. 8A rotated 90.degree. about longitudinal axis Y1-Y1 of FIG. 8A.

Referring to the fragmentary exploded perspective of the dispenser in FIG. 6, the rod 9 includes a center bore 19 that extends along its longitudinal axis and defines openings 21a, 21b at each end of the rod (only the opening 21a at the handle 17 is fully visible in FIG. 6). It is envisioned that the rod 9 is formed of a metal (e.g., steel or aluminum), but it may be constructed of a hard plastic or other sufficiently rigid material capable of retaining the ferrules 3 on the rod 9 and placing them on the work surface 4. In addition, even though the illustrated rod 9 is circular in section, it is to be understood that a rod having a different cross section does not depart from the scope of the invention. The opening 21a at the handle 17 along with the center bore 19 beneficially enables the rod 9 to receive a spindle 23 of ferrules for easily loading the ferrules onto the rod. This unique loading system will be described in more detail with reference to FIGS. 14-17 hereinafter.

Now referring to FIGS. 5-7B, the spring loaded cam system 13 of the illustrated dispenser generally comprises a cylindrical cam 27, a compression spring 29, and two ferrule release pins 31. The compression spring 29 is located in the rod 9 between the cam 27 and an abutment pin 35. The abutment pin 35 passes through the rod's center bore 19, along a diameter of the rod, and is releasably supported by the rod 9 through two holes 37 located on opposites sides of the rod 9. In this position, the abutment pin 35 is vertically fixed within the rod 9 and provides a reaction surface for the spring 29 when the cam 27 moves into and out of the rod 9 during operation. While the illustrated embodiment shows the compression spring 29 biasing the cam 27, it is understood that a ferrule dispenser having a different device similarly capable of biasing a cam does not alter the scope of the invention.

Referring now to FIGS. 6-10, the cam 27 is elongated and generally cylindrical, and is disposed generally in the dispensing end 15 of the rod along the rod's longitudinal axis. The cam 27 is formed as a solid mass of material, which ideally is the same as the material used to form the rod 9. However, a hollow cam, a cam formed from a composite material, or a cam formed from multiple, individual sections does not depart from the scope of this invention. Although it is formed as one piece, for convenience the cam 27 is described herein as having three sections, including a tail 41 at a first longitudinal end, a nose 43 at a second longitudinal end, and a central portion 45 therebetween (FIGS. 8A and 8B). The tail 41 is relatively located toward the handle 17 and engages the compression spring 29, while the nose 43 projects out of the opening 21b at the dispensing end 15 of the rod. The tail 41 includes a relatively thick web 47, two arcuate flanges 49, and an oval-shaped opening 51. The opening 51 extends completely through the web 47 and both flanges 49, and is intended to receive a keeper pin 53 which is supported by the rod 9 through two holes 55 in the rod in similar fashion to the abutment pin 35 previously described. The keeper pin 53 is located between the abutment pin 35 and the rod's dispensing end 15. It slidably retains the cam 27 in the rod 9 and prevents the cam from canting relative to the longitudinal axis of the rod during operation.

Figure 9A:
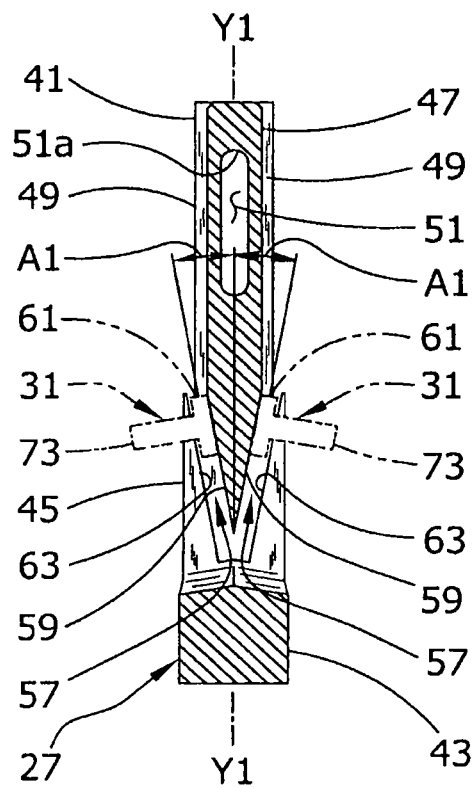
FIG. 9A is a longitudinal section of the cam taken on line 9A-9A of FIG. 8B with two ferrule release pins shown in phantom and engaged by the cam.
Figure 9B:
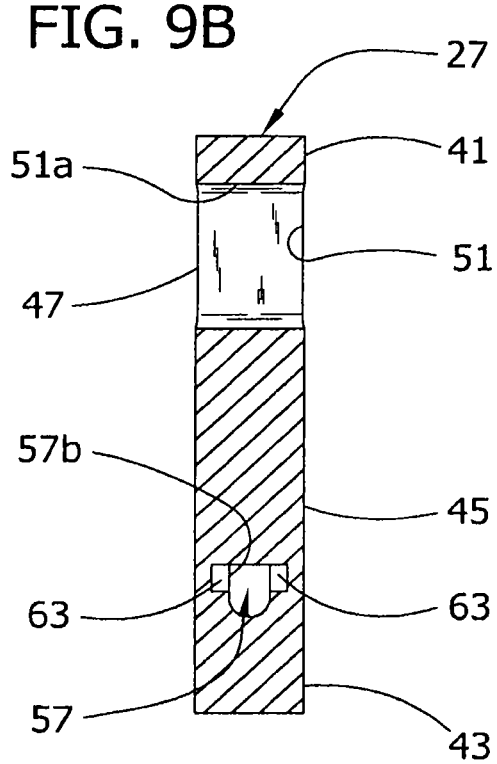
FIG. 9B is the section of FIG. 9A rotated 90.degree. about longitudinal axis Y1-Y1 of FIG. 9A.
Figure 10:
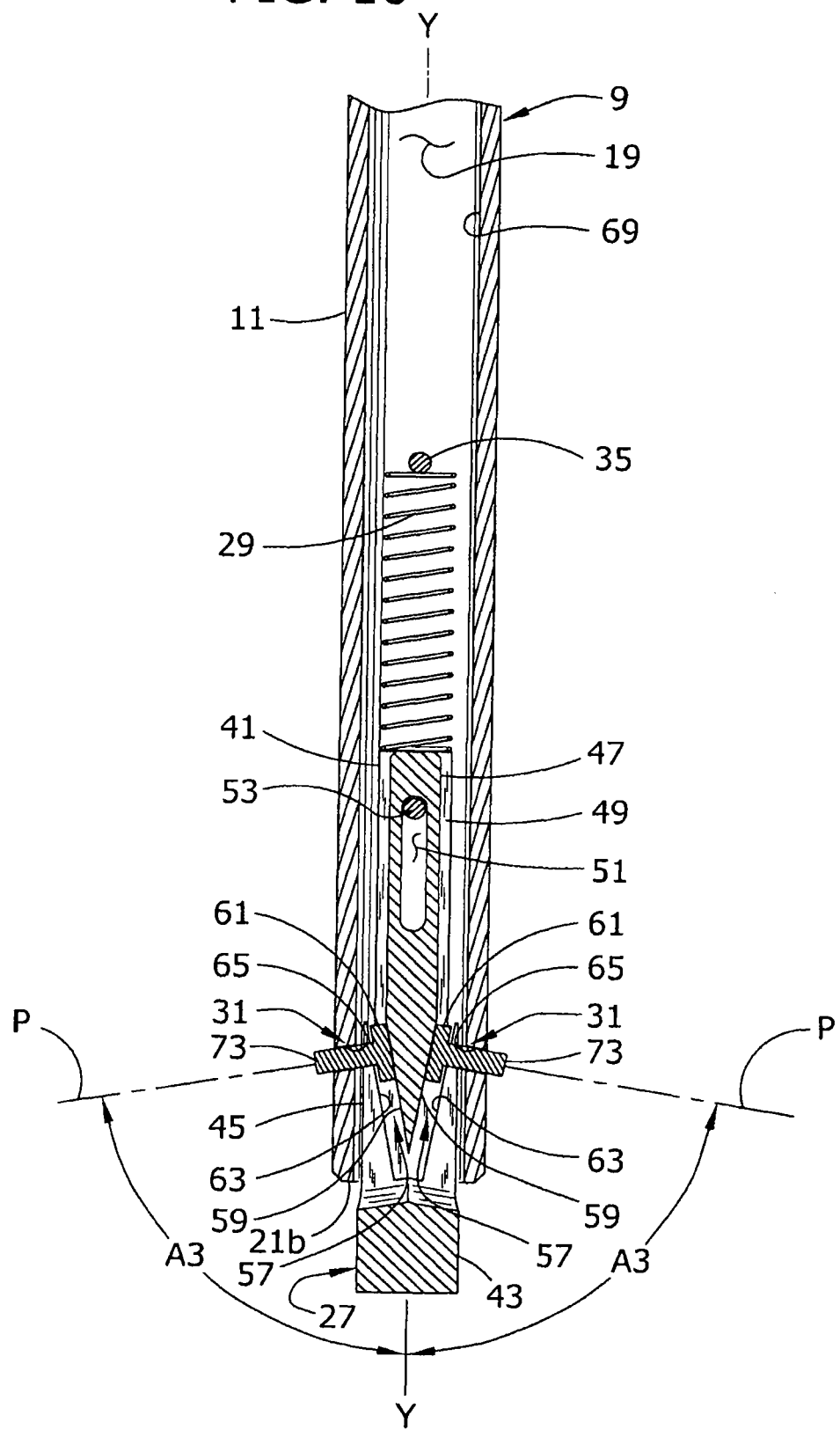
FIG. 10 is a fragmentary longitudinal section of the ferrule dispenser.

The central portion 45 of the cam includes two channel-shaped tracks, designated generally by reference numeral 57, extending generally longitudinally along opposite sides of the cam 27. Each track 57 includes a planar cam surface 59 along a floor of the track and two overhanging lips 63 opposite the cam surface and running parallel thereto. The cam surface 59 and lips 63 of each track are arranged at an angle A1 (FIG. 9A) to the longitudinal axis of the cam 27, so that the corresponding cam surfaces 59 and pairs of lips 63 each converge toward the nose 43 of the cam. When the two tracks 57 and their converging cam surfaces 59 and lips 63 are viewed in section from a side, they form a "V" shape (FIGS. 9A and 10). In the illustrated dispenser 1, the angle A1 of the converging surfaces is about 10.degree.-15.degree., but a dispenser in which this angle A1 is more or less than 10.degree.-15.degree. does not depart from the scope of the invention. In addition, a dispenser with more or less than two ferrule release pins or with a cam designed to capture more or less than two ferrule release pins does not depart from the scope of the invention.

Now referring to FIGS. 6, 7A, 7B, 9A, 10, and 11, each captured ferrule release pin 31 extends perpendicularly away from the tracks 57 of the cam and passes through a hole 65 in the rod's wall 39. Each hole 65 is located on an opposite side of the rod 9, and both holes are offset about 90.degree. around a circumference of the rod as compared to the location of the pairs of holes 37, 55 receiving the abutment pin 35 and the keeper pin 53. A dispenser in which this offset is greater than or less than 90.degree. does not depart from the scope of the invention. A path P of each hole 65 (FIG. 10) angles relatively downward, toward the dispensing end 15 of the rod, so that a nonperpendicular angle A3 is formed between the hole's path P and the longitudinal axis of the rod 9. In the illustrated dispenser 1, this angle A3 is about 75.degree.-80.degree., but a dispenser having holes for ferrule release pins making a path that angles more or less than 75.degree.-80.degree. with respect to a longitudinal axis of a rod does not depart from the scope of the invention. When this angle A3 is added to the previously described acute angle A1 (FIG. 9A) formed between the cam surface 59 and the cam's longitudinal axis, the two angles form a sum of about 90.degree.

Figure 9C:
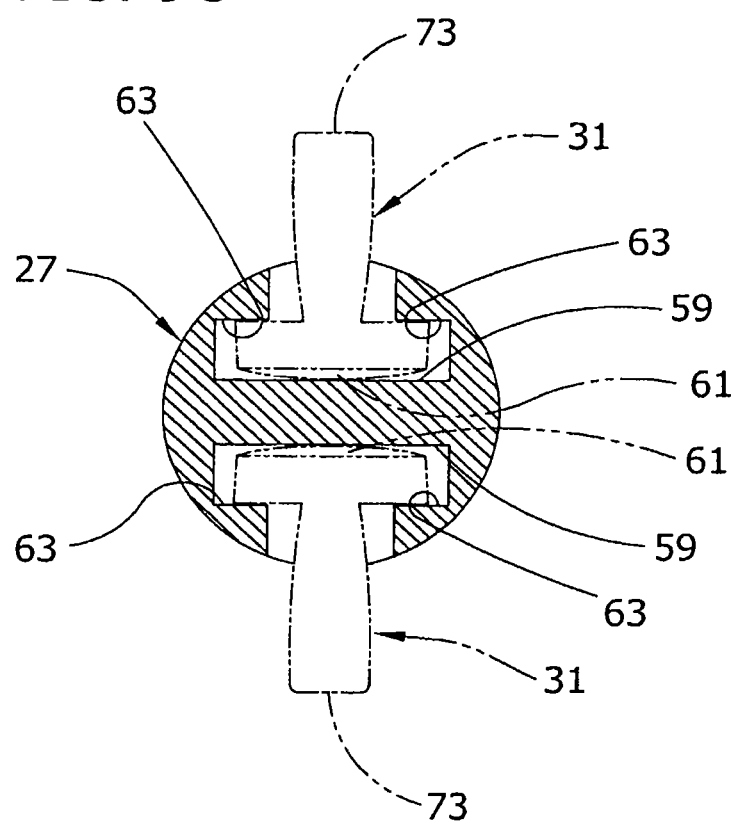
FIG. 9C is a section of the cam taken on line 9C-9C of FIG. 8B with two ferrule release pins again shown in phantom and engaged by the cam.

As is now apparent and as will be described in greater detail hereinafter, the cam surfaces 59 and overhanging lips 63 of each track 57 loosely capture a circular base 61 (FIG. 7B) of a respective one of the ferrule release pins 31 within the cam 27 (see FIGS. 9A and 9C which shows the cam 27 in section and the release pins 31 in broken lines to illustrate their relationship with the cam). This allows the two pins 31 to slide within the tracks 57 of the cam along the cam surfaces 59, but restrains them from moving perpendicular to the cam surfaces. Thus, the bases 61 of the pins slide along the cam surfaces 59 as the cam 27 moves longitudinally of the rod 9, and the pins 31 slide through the holes 65 in the rod. The pins 31 do not, however, move longitudinally of the rod.

A benefit of this ferrule dispenser 1 is that the ferrule release pins 31 can be removed from the cam system 13 and rod 9 with relative ease. If one of the pins 31 is damaged during operation, it can be quickly replaced. To accomplish this, the worker slides the keeper pin 53 from its respective holes 55 in the rod 9 using a punch or other similar device. This allows the cam 27 to freely slide out of the rod 9 through the rod's dispensing end 15. The ferrule release pins 31 disengage the cam's tracks 57 and the damaged pin 31 can be manually removed through the rod's dispensing end 15. After replacing the damaged pin 31, the worker places the new pin 31 back into its respective hole 65 in the rod. The worker then slides the cam 27 back through the dispensing end 15 so that its tracks 57 engage and capture the bases 61 of the release pins. At the same time, the worker ensures the compression spring 29 remains positioned above the cam's tail 41. The worker completes the repair by sliding the keeper pin 53 back through its holes 55 in the rod and opening 51 in the cam 27, and the dispenser 1 is again ready for operation.

Figure 11A:
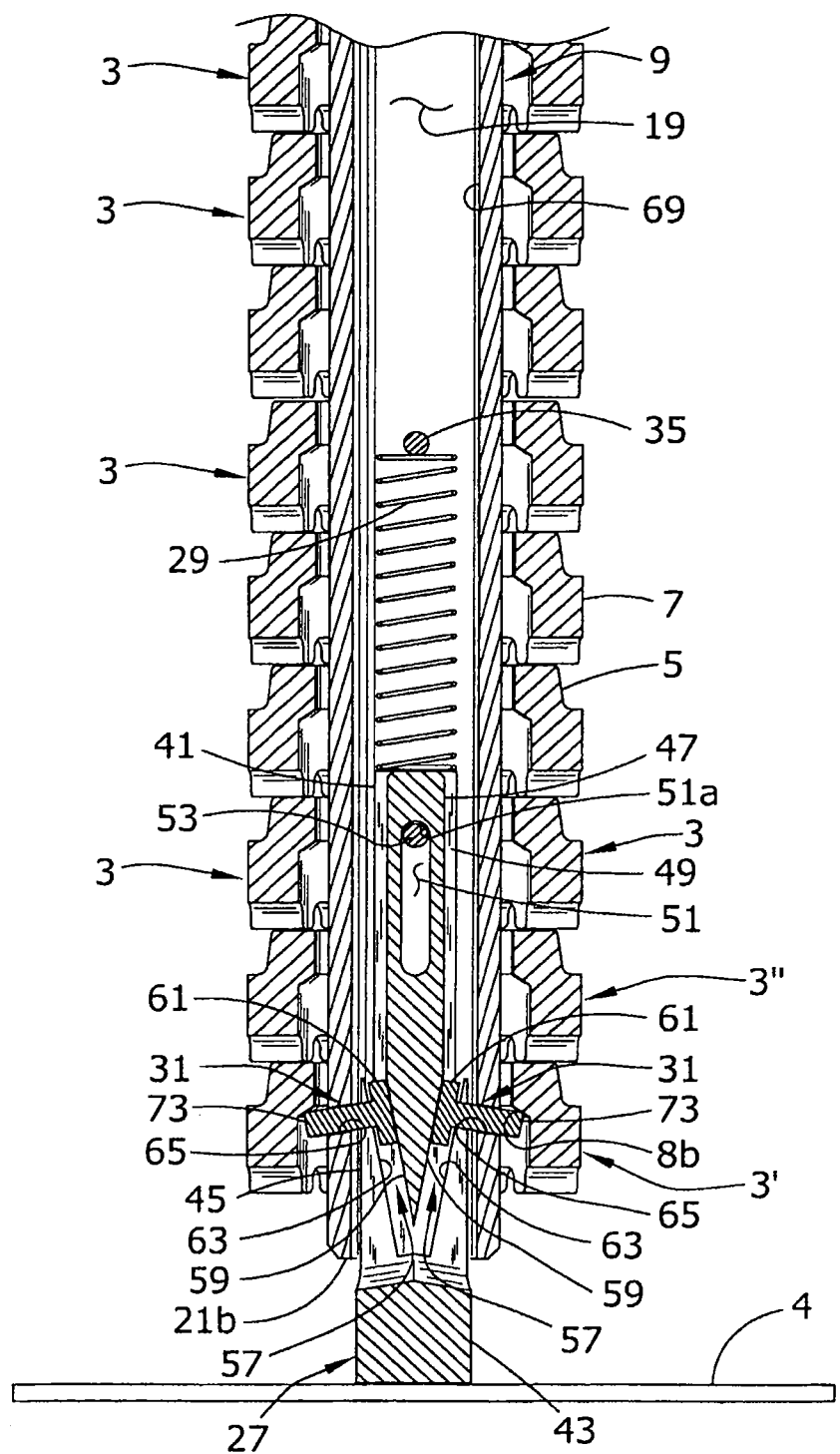
FIG. 11A is a fragmentary longitudinal section of the ferrule dispenser loaded with ferrules and in a hold position, just prior to releasing a lowermost ferrule onto the work surface.
Figure 11B:
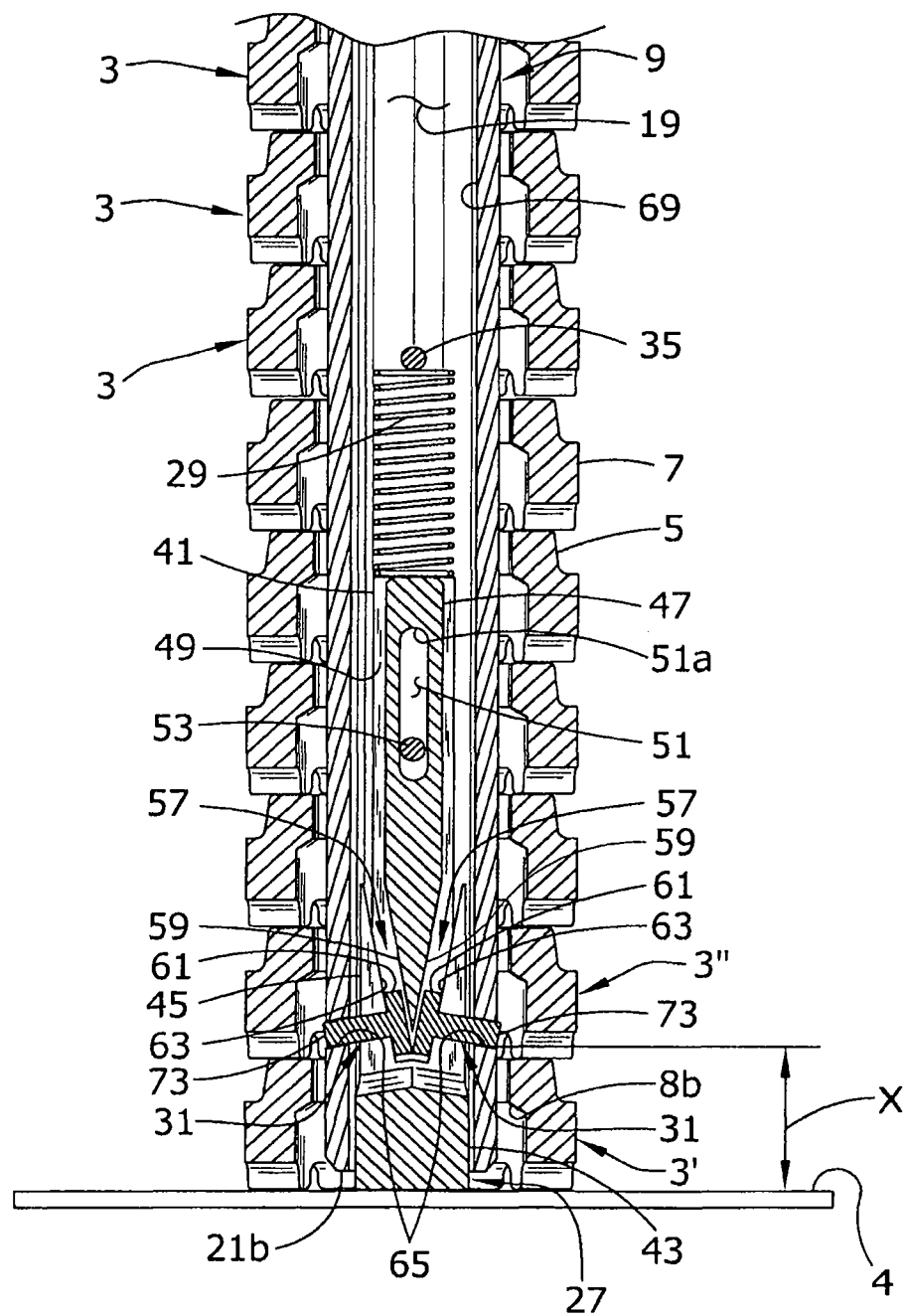
FIG. 11B is a section similar to FIG. 11A with the ferrule dispenser in a release position, releasing the lowermost ferrule onto the work surface.
Figure 11C:
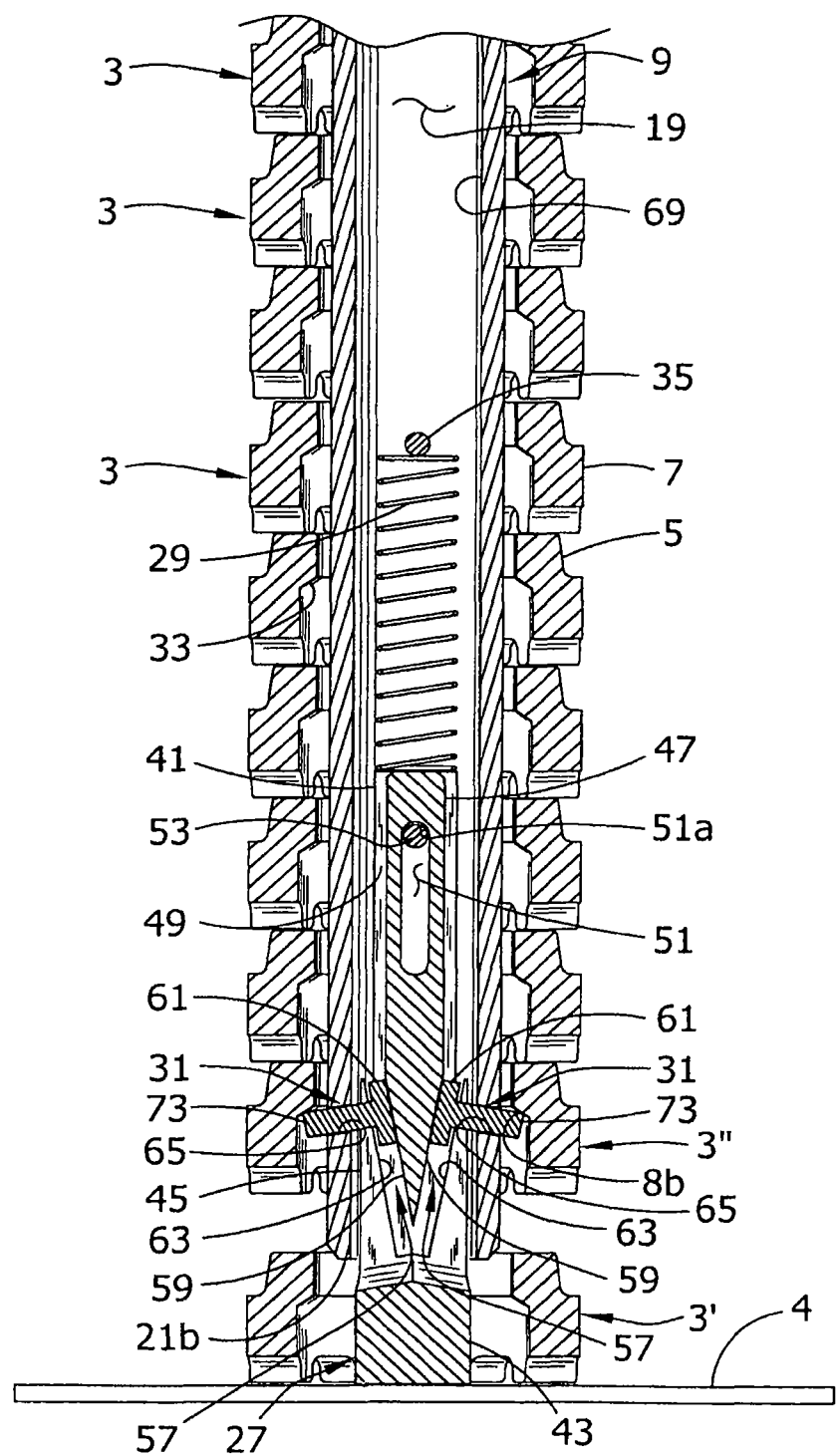
FIG. 11C is a section similar to FIG. 11B with the ferrule dispenser in the hold position, just after releasing the lowermost ferrule onto the work surface.

FIGS. 11A-11C illustrates operation of the ferrule dispenser 1 for releasing the lowermost ferrule 3' onto the work surface 4, while retaining the ferrules 3 thereabove on the rod 9. FIG. 11A illustrates the ferrule dispenser 1 in a hold position, prior to releasing the lowermost ferrule 3'. Here, the spring 29 biases the cam's nose 43 axially outward of the rod 9, through the dispensing end 15, and holds it in this position until operation begins. The keeper pin 53 engages a top side 51a of the oval-shaped opening of the tail and prevents the spring 29 from forcing the cam 27 completely out of the rod 9. The ferrule release pins 31, which are each captured in the cam's tracks 57, are positioned near an upper end of each track, near the cam's tail 41. The pins 31 extend perpendicularly outward from the tracks 57 and pass through the respective holes 65 in the rod's wall 39. The pins 31 engage the inner shoulder 8b of the lowermost ferrule and hold it and the ferrules 3 thereabove on the rod 9. The skirt 7 of each retained ferrule engages the top collar 5 of a lower ferrule (with the exception of the lowermost ferrule 3') and all of the ferrules 3 are retained on the rod 9 in proper orientation for placement on the work surface 4.

To release the lowermost ferrule 3' from the rod 9, the worker positions the dispenser 1 with the cam's nose 43 engaging the work surface 4 (see FIG. 1) and pushes the dispenser 1 downward. As shown in FIG. 11B, this moves the rod 9 over the cam 27. The keeper pin 53, the abutment pin 35, and the two ferrule release pins 31 each move downward conjointly with the rod 9. The keeper pin 53 guides the cam 27 as it slides upward into the rod 9 and prevents it from canting relative to the longitudinal axis of the rod. At the same time, the abutment pin 35 compresses the compression spring 29 against the cam's tail 41, tending to resist the rod's downward motion. The ferrule release pins 31 move downward within the cam's tracks 57 and along the tracks' angled cam surfaces 59. As the release pins 31 move, the overhanging lips 63 of the cam's tracks engage the base 61 of each respective pin and positively pull the pin 31 inward relative to the rod 9. This prevents the pin 31 from sticking in the hold position and jamming ferules 3 on the rod 9. When both pins 31 reach the track's bottom longitudinal end near the nose 43 of the cam, their distal ends 73 move substantially into their respective holes 65 and disengage the lowermost ferrule 3'. This allows the ferrule 3' to fall onto the work surface 4 and allows the ferrules 3", 3 thereabove to move down relative to the rod 9. This also prevents the pins 31 from inadvertently retaining an irregular ferrule with a slightly smaller than average diameter on the rod 9.

As the worker raises the dispenser 1 from this release position of FIG. 11B, and returns it to the hold position of FIG. 11C, the keeper pin 53, the abutment pin 35, and the two ferrule release pins 31 each move upward conjointly with the rod 9. The compression spring 29 expands and forces the cam 27 downward, holding the cam's nose 43 against the work surface 4 as the rod 9 is raised. The ferrules 3 on the rod 9 tend to remain in place relative to the rod 9 as the rod moves so that the lowermost ferrule 3' slides off the rod's dispensing end 15 and remains on the work surface 4. The downward slope of the release pins 31 helps to keep the lowermost ferrule 3' from hanging up on the pins 31 as it is dispensed. The keeper pin 53 slides upward in the tail's opening 51 and again guides the cam 27 back through the dispensing end 15, preventing it from canting. As the two ferrule release pins 31 move upward with the rod 9, they also slide up the cam's tracks 57. So when both ferrule release pins 31 reach the upper end of their representative tracks 57, the pins' distal ends 73 are at maximum radial extension and engage the shoulder 8b of a next subsequent ferrule 3", retaining it and the remaining ferrules 3 thereabove on the rod 9. At approximately the same time, the keeper pin 53 engages the top side 51a of the opening 53 and pulls the nose 43 off the work surface 4. The compression spring 29, now fully expanded, again holds the cam 27 in position for retaining the remaining ferrules 3 on the rod 9. The process may be repeated to release the next subsequent ferrule 3" at a second desired location.

As just described, a benefit of the ferrule dispenser 1 is that the cam surfaces 59 positively pull the release pins 31 inward through the corresponding holes 65 in the rod, and also positively push the release pins outward through the corresponding holes. This prevents the pins 31 from sticking or jamming in the holes 65 of the rod and ensures that the pins 31 retract fully inward and extend fully outward of the rod 9. Thus, the pins 31 reliably release each ferrule 3, and reliably engage each subsequent ferrule on the rod 9 and prevent multiple ferrules from inadvertently falling during operation. In addition, the length of each ferrule release pin 31 ensures that when the pins are fully extended they will securely retain all ferrules 3 on the rod 9, including irregular ferrules with slightly larger than average diameters.

As is now apparent, the size of ferrules capable of being used with the ferrule dispenser 1 described and illustrated herein depends on the dispenser's dimensions, particularly a general distance of the ferrule release pin holes 65 from the dispensing end 15 of the rod. The dispenser 1 is generally capable of using ferrules 3, 3m with an overall height H that is about equal to the general distance from the ferrule release pin holes 65 to the dispensing end 15 of the rod (this general distance will be described in more detail hereinafter). The dispenser is additionally capable of using ferrules 3, 3m with an overall height H that is less than the general distance from the ferrule release pin holes 65 to the dispensing end 15 of the rod, but when the ferrule height becomes too small in comparison to the hole distance from the dispensing end, more than one ferrule 3, 3m may fall from the rod 9 during a single dispensing cycle. It is envisioned that the distance from the release pin holes 65 to the dispensing end 15 of the rod, as measured by a distance X (FIG. 11B) along the rod's longitudinal axis from the nose 43 of the cam (as measured when the cam 27 is fully retracted and the dispenser 1 is in the release position) to the bottom of either ferrule release pin hole 65, is about 0.7 inches. Accordingly, this dispenser 1 is capable of using any type of ferrule (including the standard and modified types described herein) having an overall height H of about 0.7 inches.

It is to be understood, however, that a ferrule dispenser in which a distance X along the rod's longitudinal axis from the nose 43 of the cam (as measured when the cam 27 is fully retracted and the dispenser 1 is in the release position) to the bottom of either ferrule release pin hole 65 is greater than 0.7 inches or is less than 0.7 inches does not depart from the scope of the invention. For example, the ferrule dispenser 1 can be modified so that the distance X along the rod's longitudinal axis from the nose 43 of the cam (as measured when the cam 27 is fully retracted and the dispenser 1 is in the release position) to the bottom of either ferrule release pin hole 65 is about 0.5 inches or less. This modified dispenser 1 could generally use ferrules 3 with a corresponding overall height H that is about 0.5 inches or less. Accordingly, this dispenser 1 could use the modified ferrules 3m (FIGS. 3A-4B) described herein, or other types of ferrules with a corresponding overall height H of about 0.5 inches or less. As another example, the ferrule dispenser 1 could be modified so that the distance X along the rod's longitudinal axis from the nose 43 of the cam (as measured when the cam 27 is fully retracted and the dispenser 1 is in the release position) to the bottom of either ferrule release pin hole 65 is about 0.8 inches or more. This modified dispenser 1 could generally use ferrules with a corresponding overall height H that is about 0.8 inches or more. It is envisioned that the dimensions of the ferrule dispenser 1, including a diameter of the rod 9, could be modified without limitation so that the dispenser could accommodate any type of ferrule. It is understood that such modifications do not alter the scope of the invention The ferrule dispenser 1 described and illustrated herein could also be modified so that, for example, an elongate support (not shown) retains the ferrules 3, 3m inside the support (instead of on a rod's outer surface as described and illustrated herein), as is shown in U.S. Pat. No. 4,600,118 (Martin) and U.S. Pat. No. 5,704,515 (Martin), the entire disclosures of which have been herein incorporated by reference. But it is to be understood that a cam of this dispenser still positively pulls or pushes ferrule release pins relative to the elongate support to either hold ferrules inside the support or release them onto a work surface.

Figure 12:
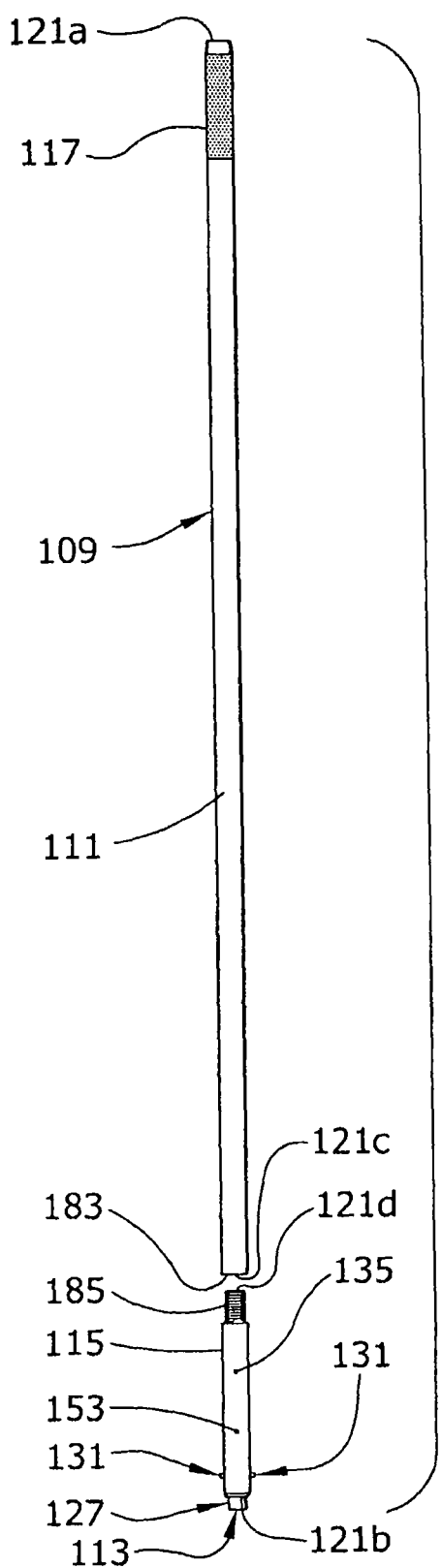
FIG. 12 is an exploded elevation of a ferrule dispenser according to a second embodiment having a rod internally threaded for removably attaching a dispensing head of the dispenser.
Figure 13:
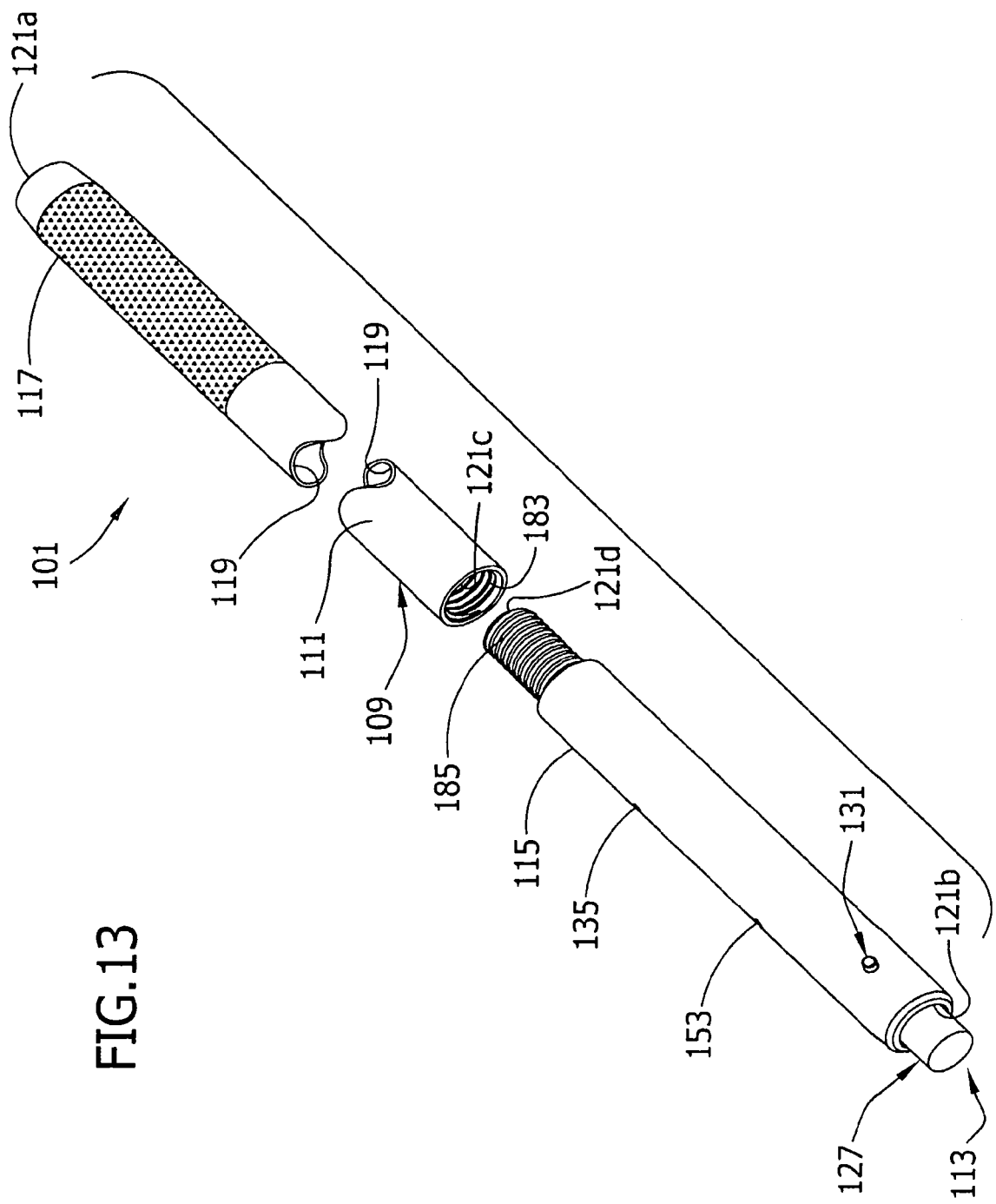
FIG. 13 is an enlarged, fragmentary exploded perspective of the ferrule dispenser of FIG. 12.

FIGS. 12 and 13 illustrate a second embodiment of the ferrule dispenser, which is designated generally by reference numeral 101 (and broadly referred to as a ferrule dispenser tool). Parts of this dispenser 101 corresponding to parts of the dispenser 1 previously described and illustrated (FIGS. 1-11C) are designated by the same reference numerals, plus "100." This dispenser 101 is substantially similar to the dispenser 1 previously described and illustrated, but includes a dispensing head 115 that is removably attached to an elongate support (the elongate support is again shown as a rod 109 in the illustrated embodiment) of the dispenser. As shown in FIG. 13, an end 121c of the rod 109 includes internal threading 183 and an end 121d of the dispensing head 115 includes corresponding external threading 185. Thus, the dispensing head 115 can be attached to the rod 109 by screwing the threaded ends 121c, 121d together. Similarly, it can be unattached from the rod 109 by unscrewing the two ends 121c, 121d. When the dispensing head 115 is attached to the rod 109, the dispenser 101 and its dispensing head operate identically to the previously described dispenser 1 for placing ferrules 3 onto a work surface (not shown). It is understood that a dispenser (not shown) having a rod with external threading to receive a mating dispensing head or having a rod and dispensing head that attach to one another differently, for example by a pin and hole type attachment, does not depart from the scope of the invention. In addition, it is understood that the a dispenser having an elongate support different from a rod, or an elongate support that receives ferrules inside the support does not depart from the scope of the invention. Thus, it is envisioned that the elongate support of this embodiment can receive any type of dispensing head known in the art and that it is not limited to receiving the dispensing head described and illustrated herein.

As with the rod 9 of the dispenser 1 previously described, the rod 109 of this embodiment's dispenser includes a center bore 119 that extends along its longitudinal axis. In this embodiment, the center bore 119 defines the opening 121c at the threaded end of the rod along with an opening 121a at a handle 117 of the rod. The opening 121a at the handle 117, along with the center bore 119, beneficially enables the rod 109 to receive a spindle 23 of ferrules for easily loading the ferrules onto the rod during the welding process. Loading ferrules onto the rod 109 of this dispenser 101 is done identically to loading ferrules onto the rod 9 of the previously described dispenser 1, and will be described in more detail with reference to FIGS. 14-17 hereinafter.

Figure 14:
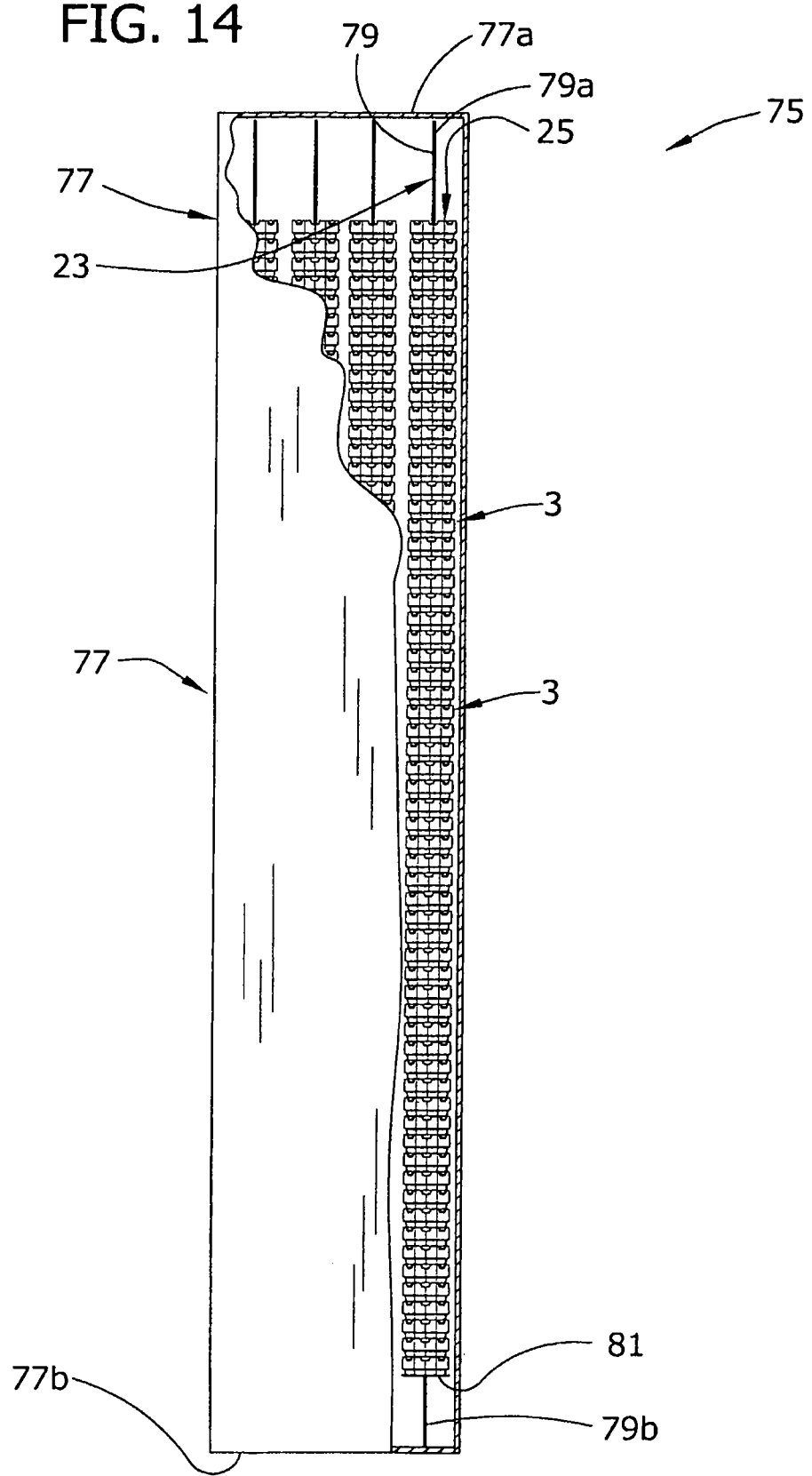
FIG. 14 is an elevation of a package of ferrules with a portion of a container of the package broken away.
Figure 15:
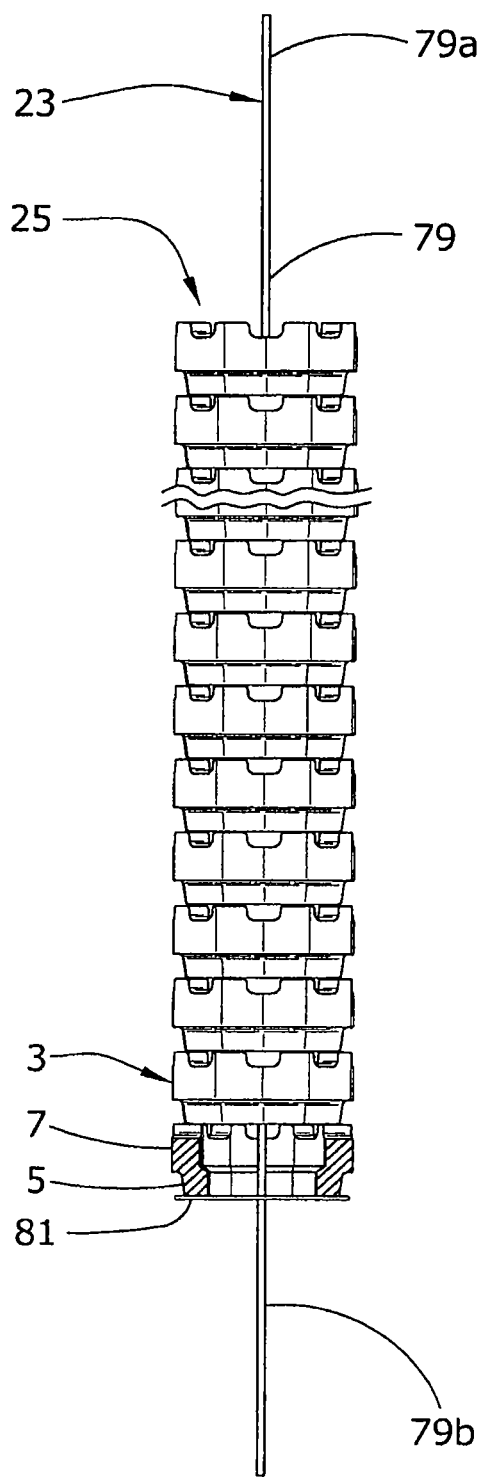
FIG. 15 is a fragmentary elevation of a set of ferrules and spindle of the package of ferrules of FIG. 14 with a portion of one ferrule broken away.

Referring now to FIG. 14, a package of standard stud welding ferrules is designated generally by reference numeral 75. The package 75 generally comprises a container (in the illustrated package, the container is a box 77, having a top 77a, a bottom 77b, and four sides). The package 75 also comprises a number of ferrule sets 25, each with a number N of ferrules 3 therein arranged in a uniform stack. The spindle 23 holds the ferrules 3 of each set uniformly stacked by passing through the open center of each ferrule in the set. In the illustrated embodiment, the package 75 includes four sets 25 of ferrules, and each set contains sixty-three ferrules. This matches the number of ferrules received on the loaded ferrule dispenser 1 previously described. A package of stud welding ferrules with a different shaped container does not depart from the scope of the invention. A package having a different number of ferrule sets or having ferrule sets with greater than or less than sixty-three ferrules therein does not depart from the scope of this invention As shown in FIGS. 14 and 15, the spindle 23 of the package comprises a length of relatively rigid wire 79 having a first end 79b with a flat, circular retainer 81 and a second end 79a without such a retainer. To form the package 75 of the present invention, the set 25 of ferrules is loaded onto the spindle 23 so that the top collar 5 of a first ferrule in the set rests against the retainer 81. The retainer 81 has a diameter that is at least larger than an inner diameter D (FIGS. 2A-4B) of the ferrule's top collar and thereby retains the first ferrule and the other ferrules 3 in the set 25 on the spindle 23. The loaded spindles 23 are then placed in the box 77 in an upright position, with the first end 79b of each spindle oriented below the second end 79a and contacting the bottom 77b of the box. The loaded box 77 is closed, securely holding the sets 25 of ferrules and preventing them from moving off the second end 79a of the spindle during shipping or storing. In the illustrated package 75, the second end 79a of the spindle is near the top 77a of the container, separated therefrom by a distance that is generally less than the height H (FIGS. 2A-4B) of one of the ferrules. But it is understood that a package in which a second end of a spindle engages a top of a container or alternatively has a greater spacing than just described does not depart from the scope of the present invention. Preferably, the box 77 is marked so as to indicate which end should be elevated and/or which end should be picked up first. While it is described that the spindle comprises a relatively rigid wire for holding the ferrules in stacked arrangement, it is understood that any similar structure, such as a thin wire or a rigid rod, can be used without departing from the scope of the invention.

Figure 16A:
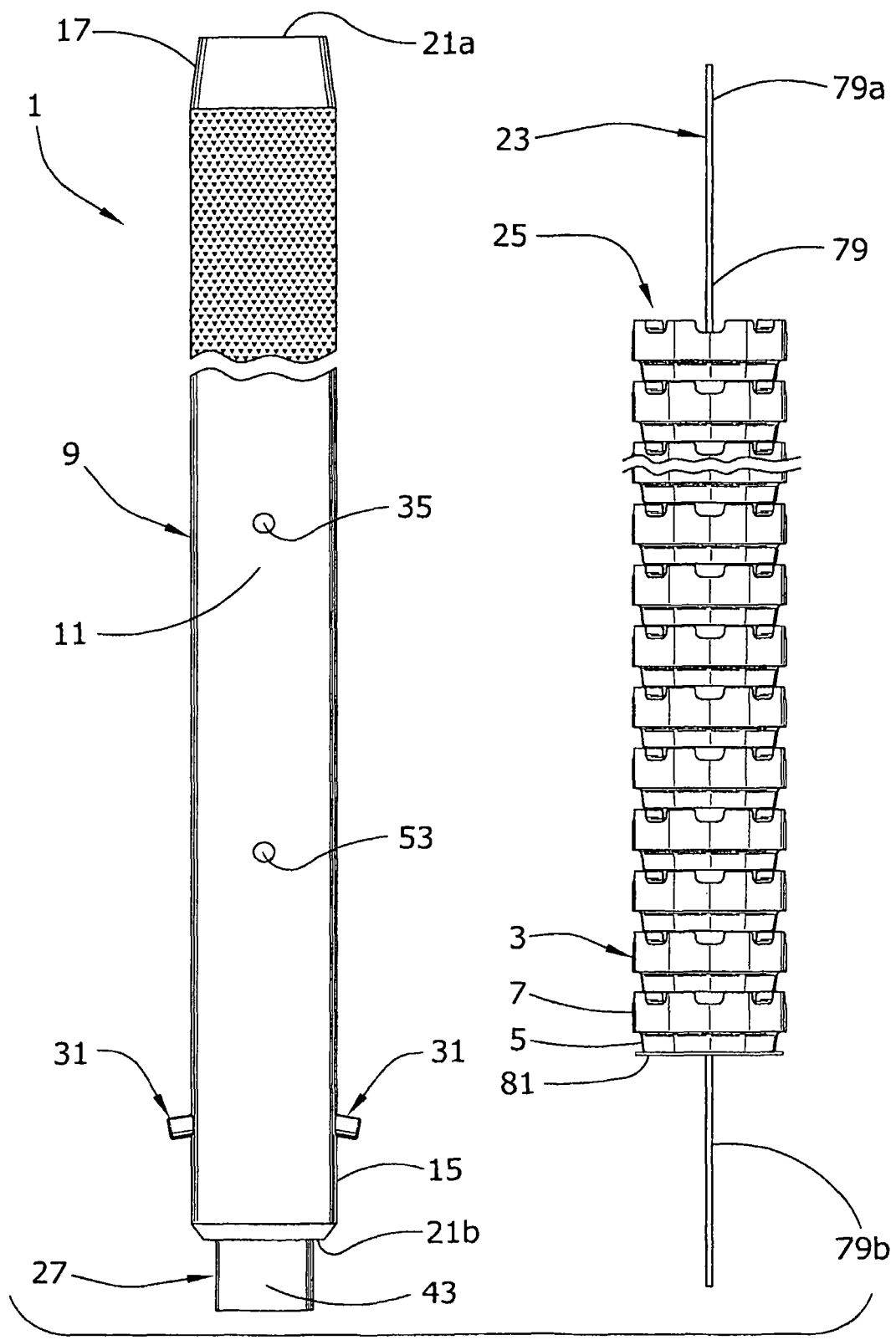
FIG. 16A is a fragmentary elevation of the ferrule dispenser of FIG. 5 positioned next to the set of ferrules and spindle of FIG. 15.
Figure 16B:
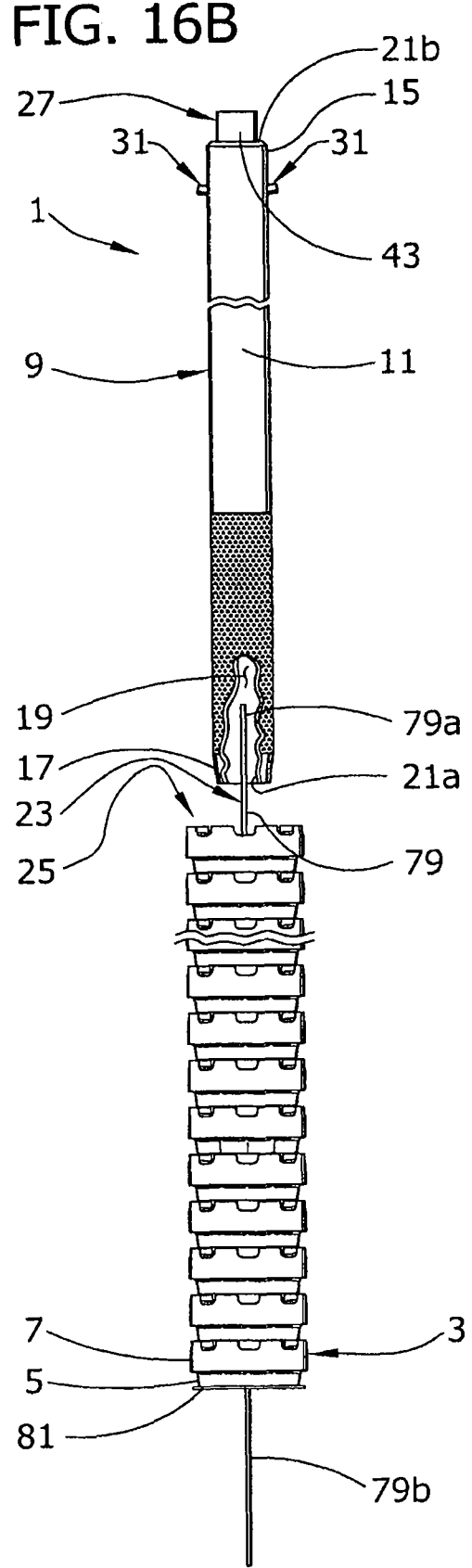
FIG. 16B is a fragmentary elevation of the ferrule dispenser, set of ferrules, and spindle of FIG. 16A with the ferrule dispenser and spindle oriented for loading ferrules from the spindle onto the dispenser.

Moving to FIGS. 16A-17, a method of loading one of the sets 25 of ferrules onto the ferrule dispenser 1 is illustrated. The worker (not shown) removes one spindle 23 and the set 25 of ferrules retained thereon from the package 75 and, firmly grasping both ends 79a, 79b of the spindle, shakes the spindle 23 to uniformly align the ferrules 3 along the wire 79 (FIG. 16A). The worker next positions the spindle 23 on the ground (not shown) with the first end 79b lower than the second end 79a. The worker then orients the empty ferrule dispenser 1 coaxially above the spindle 23 with its dispensing end 15 higher than its handle 17 (FIG. 16B). It will be understood that although the dispenser 1 and spindle 23 are generally coaxial in loading, and the first end 79a of the spindle is at a lower height than the second end 79b, the dispenser and spindle need not be vertically arranged to achieve loading.

Figure 16C:
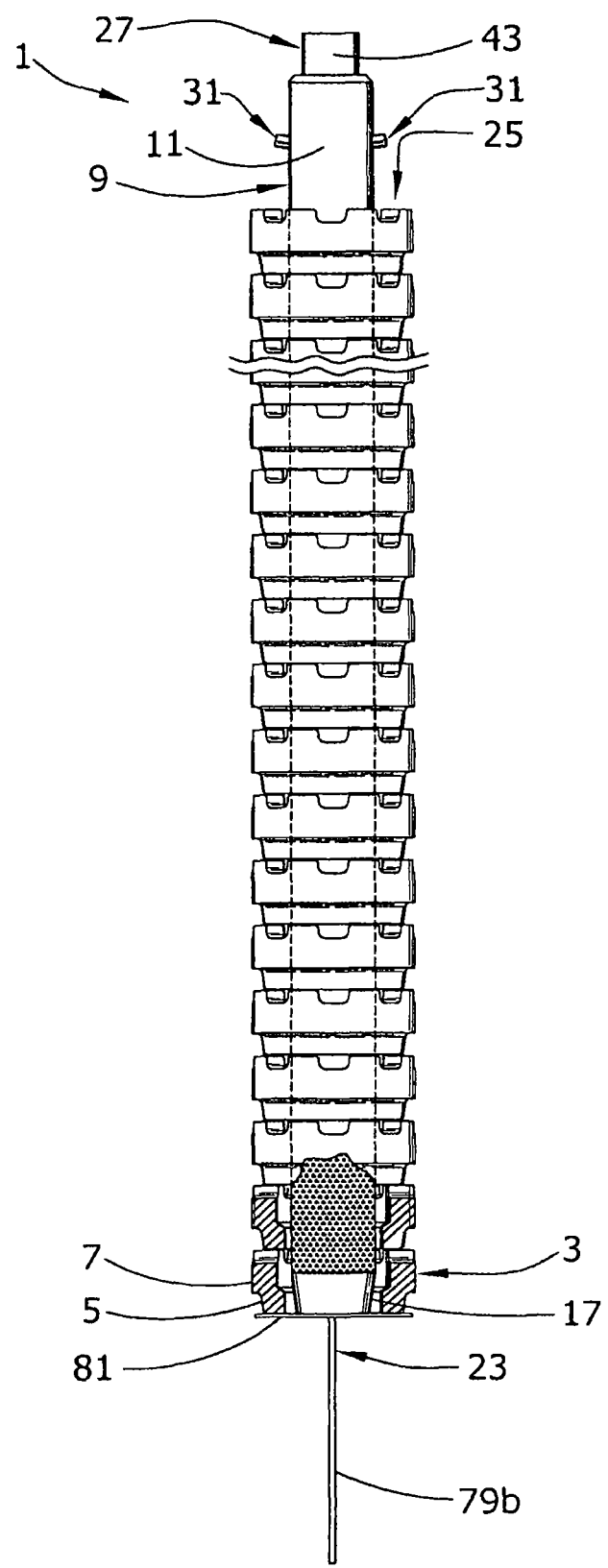
FIG. 16C is a fragmentary elevation similar to FIG. 16B with the ferrule dispenser loaded with ferrules.
Figure 18:
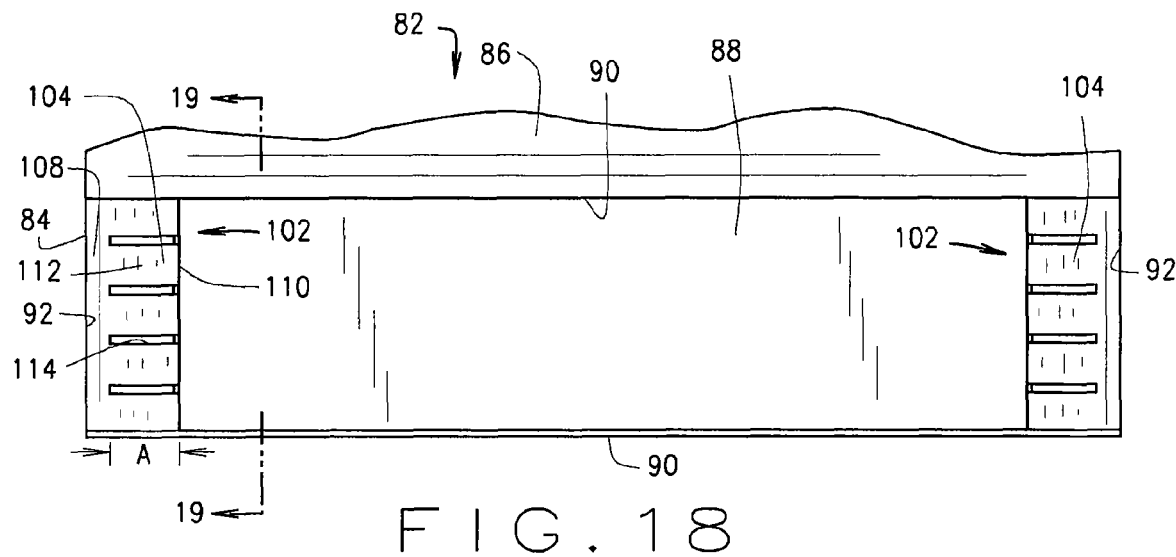
FIG. 18 is a planned view of another package for containing ferrules constructed in accordance with and embodying the present disclosure.
Figure 19:
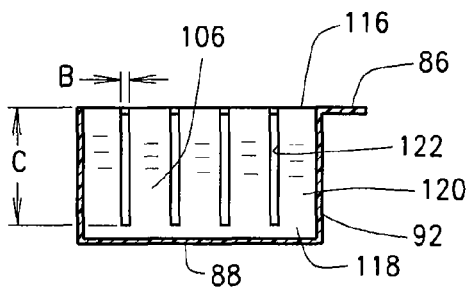
FIG. 19 is a side elevational view of a spindle retainer for receiving and retaining a spindle of ferrules.
Figure 20:
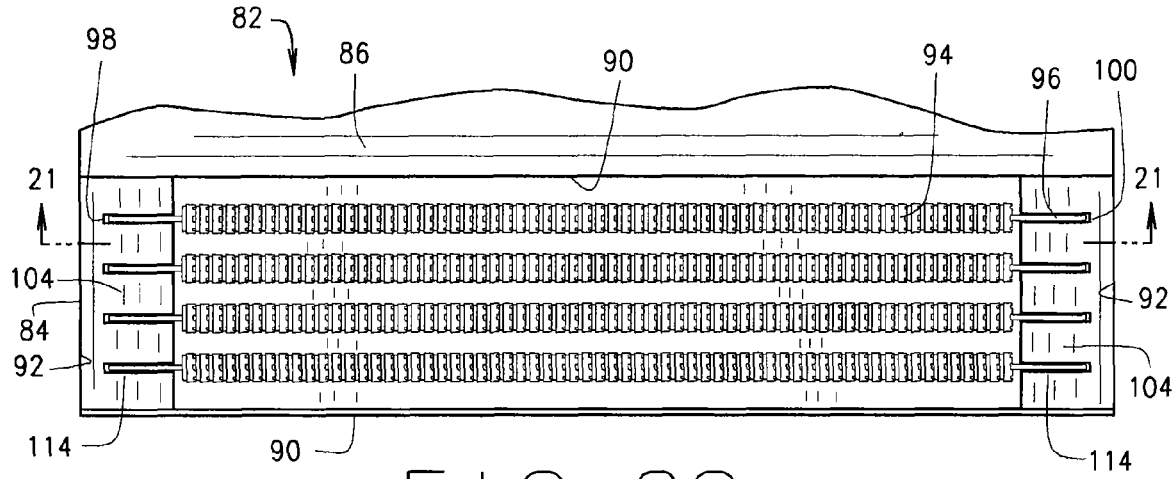
FIG. 20 is a planned view of a set of ferrules and spindles positioned within the package and retained by the spindle retainer.
Figure 25:
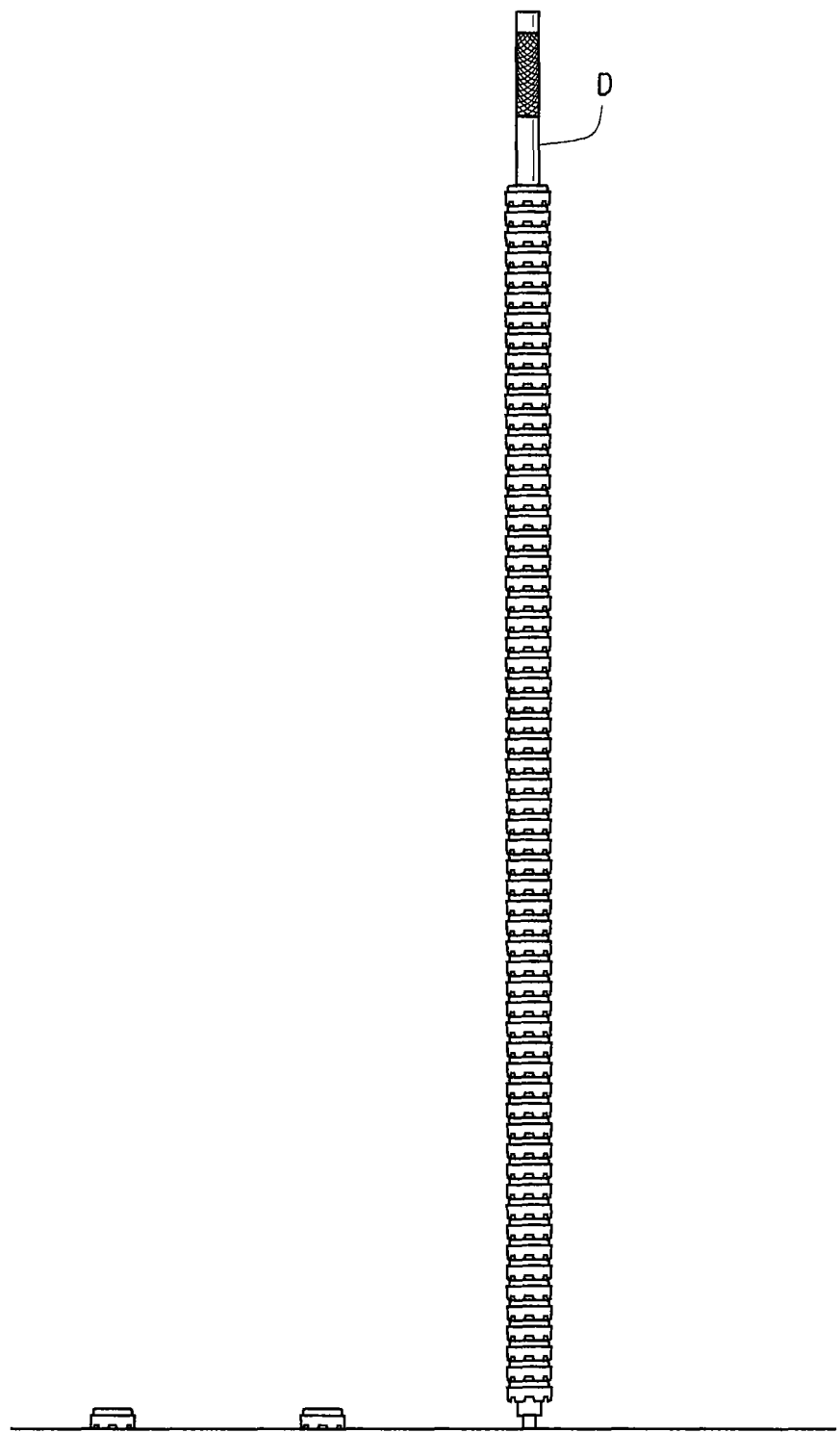
FIG. 25 is a side elevational view of the dispenser fully positioned within the set of ferrules.

The worker proceeds to load the dispenser 1 by lowering the tapered handle 17 onto the second end 79a of the spindle, passing the spindle 23 through the handle's opening 21a and receiving it into the rod's center bore 19 (FIG. 16C). The rod 9 passes through the open centers of each ferrule 3 of the set 25, moving down the spindle 23 until the handle 17 contacts the spindle's retainer 81. Finally as shown in the schematic of FIG. 17, to complete the loading process the worker (not shown) turns the inverted ferrule dispenser 1, the spindle 23, and the set 25 of ferrules 180.degree. so that the dispenser is again upright (steps (a)-(c)). Here, the dispenser's dispensing end 15 is near the ground and ready for operation. The spindle 23 may be removed from the dispenser 1 (step (d)), leaving the set 25 of ferrules on the rod 9. However, this is not necessary to initiate operation. The ferrule dispenser 1 can be used with or without the spindle 23 positioned in the rod 9.

Referring now to FIGS. 18-25, a package of ferrules is shown generally by reference number 82. The package generally comprises a container 84 (in the illustrated package the container 84 is a box, having a top 86, a bottom 88, opposing side walls 90 and opposing end walls 92 defining a storage space 93 therein). A package 82 of stud welding ferrules with a different shaped container 84 does not depart from the scope of the invention. The container 84 comprises a variety of materials, such as but not limited to, paper or cardboard. Further, the container 84 can have a variety of cross sectional shapes such as square, rectangular or other appropriate configuration. The container 84 can be of any size to accommodate ferrules, spindles and workers or users of any size.

The package 82 also comprises a number of ferrule sets 94, each with a number of ferrules "N" therein arranged in a uniformed stack along spindle 96. The spindle 96 holds the ferrules of each set uniformly stacked by passing through the open center of each ferrule in the set 94 as previously described. The spindle 96 of the package 82 comprises a length of relatively rigid wire having a first free 98 end and a second free end 100 as compared to the embodiment of FIGS. 14 and 15 which includes the circular retainer. As shown in FIGS. 20-23, spindle 96 is free from any retainer clip. The ferrules are loaded on the spindle 96 which is positioned in the center opening or center bores of the ferrules. The ferrules are always facing the same direction. Ends 98, 100 of the spindle 96 are kept free to allow for spacing for finger handling by the packer as will be discussed.

In illustrative embodiment, the package 82 includes four sets of ferrules, and each set contains 63 ferrules. This matches the number of ferrules received in the loaded ferrule dispenser "0" previously described. A package 82 having a different number of ferrule sets or having ferrule sets with greater than or less than 63 ferrules therein does not depart from the scope of the invention.

The container 84 has a length of about two and one-half feet to about three and one-half feet. Optimally, the container 84 has a length of about three feet. The container 84 has a height from about four inches to about seven inches. Optimally, the container 84 has a length of about five and three-quarter inches. The container 84 has a width from about five inches to about seven inches. Optimally, the container 84 has a width of about six and one-quarter inches.

The package 82 further comprises a spindle retainer 102 disposed within the container 84 near each end wall 92. The spindle retainer 102 is sized and shaped to accept ends of the spindle 96 and to retain the ends of the spindle 96. The spindle retainer 102 includes a transverse portion 104 and a longitudinal portion 106.

The transverse portion 104 has a proximal end 108, a distal end 110 and a body 112 positioned between the distal end 110 and the proximal end 108. The transverse portion 104 planarly extends from one end wall 92 to an opposite end wall 92 of the container 84. In one aspect, the transverse portion 104 has a rectangular configuration. The transverse portion 104 has a length from about a half inch to about two inches. Optimally, the transverse portion 104 has a length of about one and one-quarter inches. The transverse portion 104 includes a transverse slot 114 defined within the transverse portion 104. The transverse slot 114 is spaced from the proximal end 108 and extends toward the distal end 110. The transverse slot 114 has a length, "denoted A", from about a half inch to about one and one-half inches. Optimally, the transverse slot 114 has a length of about one inch. The transverse slot 114 has a width, "denoted B", of about one eighth inch to about three quarter inches. Optimally, the transverse slot 114 has a width of about one-quarter inch.

The longitudinal portion 106 has a proximal end 116, a distal end 118 and a body 120 positioned between the distal end 116 and the proximal end 118. In one aspect, the longitudinal portion 106 has a rectangular configuration. The longitudinal portion 106 planarly extends from the transverse portion 104 toward the bottom 88 of the container 84. The longitudinal portion 106 has a length from about four inches to about seven inches. Optimally, the longitudinal portion 106 has a length of about one and one-quarter inches. The longitudinal portion 106 includes a longitudinal slot 122 defined within the longitudinal portion 106. The longitudinal slot 122 operatively connects with the transverse slot 114 and extends toward the bottom 88. The longitudinal slot 122 may be spaced from the bottom 88. The longitudinal slot 122 has a length, "denoted C", from about four inches to about six inches. Optimally, the longitudinal slot 122 has a length of about five inches. The longitudinal slot 122 has a width, "denoted B", of about one eighth inch to about three quarter inches. Optimally, the longitudinal slot 122 has a width of about one-quarter inch.

Optimally, the container 84 has four spindle retainers 102 positioned at one end wall 92 and four matching spindle retainers 102 at the opposite end wall 92. The spindle retainers 102 at one end wall 92 re aligned with respect to spindle retainers 102 at the other end wall 92. A package 82 having a different number of spindle retainers 102 or having spindle retainers 102 with greater than or less than four spindle retainers 102 does not depart from the scope of the invention. The dimensions given are representative of an embodiment and not intended to limit the scope of the disclosure.

For packaging operations, once the spindle 96 is loaded with ferrules, the packer grasps each free end 98, 100 of the spindle 96 with fingers from respective hands. The packer then conveniently lifts the loaded spindle 96 and carries the loaded spindle 96 toward the container 84. Since the spindle 96 is rigid, the loaded ferrules remain in alignment while the user transports the loaded spindle 96. The packer then aligns the free ends 98, 100 of the spindle 96 with a pair of opposing transverse slots 114 and longitudinal slots of opposing spindle 96 retainers 102. The packer inserts or lowers the spindle ends 98, 100 into the respective transverse slots 114 and continues to lower the spindle 96 into the longitudinal slots 122. The transverse slots 114 and the longitudinal slots 122 are sized and shaped to accept and to retain the spindle ends 98, 100. The packer continues to lower the spindle 96 into the longitudinal slots 122 until the ferrules contact the bottom 88 of the container 84. The spindle ends 98, 100 extend through the longitudinal slots 122 and underneath the transverse slots 114 and underneath the transverse portion 104.

The longitudinal slots 122 are sized and shaped to retain the spindle ends 98, 100 to secure the ferrules along the spindle ends 98, 100 to prevent the ferrules from moving off the spindle ends 98, 100 during shipping or storing. Spacing exists along the spindle ends 98, 100 between the longitudinal portions 106 and the outermost loaded ferrules spaced along the spindle 96. The packer repeats the loading process by placing successive loaded spindles 96 and associated ferrules into the transverse slots 114 and longitudinal slots 122 and on top of the lowermost retained spindle 96 until the successive ferrules contact the lower most retained ferrules. Optimally, the packer loads four sets of loaded spindles 96 within a pair of opposing spindle retainers 102. The packer continues to load adjacent spindle retainers 102 until the box is full. The loaded box is closed, securely holding the set of loaded spindles 96 for shipment.

Upon receiving the shipped package at the work site, the worker opens the container 84 and inserts fingers around the exposed free ends 98, 100 of the spindle 96 via the spacing along the spindle ends 98, 100 between the longitudinal portions 106 and the outermost loaded ferrules. The worker lifts the loaded spindle 96 upward along the longitudinal slots 122 and out of the container 84. The longitudinal slots 122 guide the spindle ends 98, 100 as the worker lifts the loaded spindle 96 out of the container 84. The worker removes the loaded spindle 96 and the set of ferrules retained thereon from the container 84 and, and firmly grasping both ends 98, 100 of the spindle 96, shakes the spindle 96 to uniformly align the ferrules along the spindle 96.

The worker then places the loaded spindle 96 and set of ferrules retained thereon into a receiver 124 such as a v-shaped trough. The receiver 124 may be positioned on a work table or mobile cart. The receiver 124 has an open end 126, a closed end 128 and a channel body 130 disposed between the open end 126 and the closed end 128. In one aspect, the closed end 128 comprises a vertical wall. The worker orientates the spindle 96 into the receiver 124 such that the teethed ends of the ferrules face the open end 126 of the receiver 124. The worker aligns the ferrules by pushing the ferrules toward the closed end 128 such that the last ferrule contacts the closed end 128 to compact the ferrules against each other. Since the spindle 96 is free from any clipper retainer, the worker simply grasps the spindle end 98 near the open end of 126 the receiver 124 and pulls the spindle 96 out of the center bores of the ferrules wherein the receiver 124 maintains the now loose ferrules in alignment.

The worker proceeds to load the dispenser "D" by passing the handle of the dispenser through the open centers of each ferrule of the set moving down the ferrules until the handle contacts the closed end 128 of the receiver 124. To complete the loading process, the worker lifts the ferrule "D" and set of ferrules aligned thereon so that the dispensing end of the dispenser is again upright. Here, the dispensing end is near the ground and ready for operation as previously described. As described, a single worker can remove the loaded spindle 96 from the container 84; placed the loaded spindle 96 in the receiver 124; remove the spindle 96 from the ferrules and insert the dispenser "D" into the ferrules contained by the receiver 124.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Moreover, the use of "up" and "down" and "top" and "bottom" and "end" and "side" and variations thereof is made for convenience, but does not require any particular orientation of the components.

As various changes could be made in the above without departing from the scope of the invention, it is intended that all matter contained in the above description and shown in the accompanying drawings shall be interpreted as illustrative and not in a limiting sense.

The invention claimed is:

1. A method of packaging stud welding ferrules comprising:
   providing a set of stud welding ferrules, each ferrule having a height and a center opening;
   arranging the set of ferrules in a stack with a rigid spindle received through the center openings of the ferrules;
   providing structure generally at a first end of the rigid spindle for retaining ferrules on the rigid spindle and leaving a second end of the rigid spindle free of structure which would prevent ferrules from moving off of the second end of the rigid spindle; and
   placing the rigid spindle in a spindle retainer such that the first end and the second end are configured to be inserted within respective slots of the spindle retainer and the first end and the second end of the rigid spindle are removably engaged to the spindle retainer and is spaced from the spindle retainer a distance less than the height of one of the ferrules.

2. A method of loading a ferrule dispenser with stud welding ferrules to be dispensed from the ferrule dispenser onto a work surface, the method comprising:
   orienting a spindle received through center openings of annular ferrules separately arranged generally in a stack so that a first end of the spindle having a retainer thereon configured to prevent ferrules from moving past the retainer off of the first end of the spindle, the first end of the spindle is located below a second end of the spindle free of any retainer which would prevent ferrules from moving off of the spindle at the second end thereof;
   orienting a rod so that a first rod end thereof is located higher than a second rod end;
   sliding the second rod end of the ferrule dispenser around the spindle such that the spindle is received into the rod at the second rod end thereof, the ferrules moving from the spindle onto an outer surface of the rod toward the first rod end as the spindle is inserted into the rod thereby transferring the ferrules from the spindle to the rod; and
   re-orienting the rod so that the first rod end thereof is located lower than the second rod end.

3. A method as set forth in claim 2 further comprising the step of sliding the spindle out of the rod so that the ferrules remain on the outer surface of the rod.

4. A method of loading a ferrule dispenser with stud welding ferrules to be dispensed from the ferrule dispenser onto a work surface, the method comprising:
   providing a rigid spindle having a first free end and a second free end;
   orienting at least the second free end of the rigid spindle received through center openings of annular ferrules separately arranged generally in a stack aligned along the rigid spindle;
   placing the rigid spindle and aligned ferrules into a receiver;
   sliding the rigid spindle out of the aligned ferrules;
   retaining the free, aligned ferrules in the receiver; and sliding a handle of a ferrule dispenser into the ferrules aligned within the receiver, the ferrules moving from the receiver onto an outer surface of the ferrule dispenser toward a first end of the ferrule dispenser as the ferrule dispenser is inserted into the ferrules transferring the ferrules from the receiver to the ferrule dispenser.

* * * * *